US009420643B2

(12) United States Patent
Muto

(10) Patent No.: US 9,420,643 B2
(45) Date of Patent: Aug. 16, 2016

(54) LED FLASH MODULE, LED MODULE, AND IMAGING DEVICE

(71) Applicant: Rohm Co., Ltd., Kyoto-shi, Kyoto (JP)

(72) Inventor: Gen Muto, Kyoto (JP)

(73) Assignee: ROHM CO. LTD., Kyoto (JP)

( * ) Notice: Subject to any disclaimer, the term of this patent is extended or adjusted under 35 U.S.C. 154(b) by 0 days.

(21) Appl. No.: 14/524,716

(22) Filed: Oct. 27, 2014

(65) Prior Publication Data

US 2015/0102744 A1 Apr. 16, 2015

Related U.S. Application Data

(63) Continuation of application No. PCT/JP2013/062088, filed on Apr. 24, 2013.

(30) Foreign Application Priority Data

Apr. 27, 2012 (JP) ................................ 2012-103959

(51) Int. Cl.
*H05B 33/08* (2006.01)
*G03B 15/05* (2006.01)

(52) U.S. Cl.
CPC ................ *H05B 33/08* (2013.01); *G03B 15/05* (2013.01); *G03B 2215/0567* (2013.01); *G03B 2215/0575* (2013.01)

(58) Field of Classification Search
CPC ............. H03B 33/083; H03B 33/0845; H03B 33/0827; H03B 33/08; G03B 15/05; G03B 2215/0567; G03B 2215/0575
USPC .................. 315/228, 312, 187, 192, 318, 294
See application file for complete search history.

(56) References Cited

U.S. PATENT DOCUMENTS 8,994,294 B2 * 3/2015 Sawada .............. H05B 33/0833 315/187
2011/0260646 A1 * 10/2011 Moon ................ H01L 25/0753 315/294

FOREIGN PATENT DOCUMENTS

| | | | |
|---|---|---|---|
| JP | 11266295 | A | 9/1999 |
| JP | 2003215670 | A | 7/2003 |
| JP | 2006260912 | A | 9/2006 |
| JP | 2007109903 | A | 4/2007 |

OTHER PUBLICATIONS

Written Opinion of the ISA regarding PCT/JP2013/062088; Date of Mailing: Jul. 30, 2013; 4 pages.

* cited by examiner

*Primary Examiner* — Daniel D Chang
(74) *Attorney, Agent, or Firm* — Cantor Colburn LLP

(57) ABSTRACT

The LED flash module includes: a module substrate (111); an energy device (18) arranged on the module substrate; an LED module (320) arranged on the module substrate, the LED module in which a plurality of LED block units (320*a*-320*f*) are arranged horizontally, the LED block units in which a plurality of LED elements emitting light using a power source supplied from the energy device are arranged vertically; an EDLC charger circuit (311) arranged on the module substrate, and configured to charge the energy device; and an LED driver control circuit (313) arranged on the module substrate, and configured to control light emission from the LED element, wherein a wire length from a plus terminal (321) of the power supply unit to the LED element and a wire length from the LED element to a minus terminal (322) of the power are substantially equivalent with respect to each LED element.

7 Claims, 35 Drawing Sheets

LED FLASH MODULE, LED MODULE, AND IMAGING DEVICE

CROSS REFERENCE TO RELATED APPLICATIONS

This is a continuation application (CA) of PCT Application No. PCT/JP2013/062088, filed on Apr. 24, 2013, which claims priority to Japan Patent Application No. P2012-103959 filed on Apr. 27, 2012 and is based upon and claims the benefit of priority from prior Japanese Patent Application No. P2012-103959 filed on Apr. 27, 2012 and PCT Application No. PCT/JP2013/062088, filed on Apr. 24, 2013, the entire contents of each of which are incorporated herein by reference.

TECHNICAL FIELD

Embodiments described herein relate to Light Emitting Diode (LED) flash modules, LED modules, and imaging devices. In particular, the embodiments relate to LED flash modifies, LED modules, and imaging devices, each which can reduce the time required for electric charging under low voltage operations, and also can reduce physical size and weight thereof.

BACKGROUND ART

Conventionally, there are digital cameras and monitoring cameras including flash devices. As a light source of flash devices, xenon tubes have been mainly used, since such xenon tubes have short-time optical outputs and is excellent in color rendering properties.

Such flash devices are composed of a xenon tube 401, an inverter 402, an aluminum electrolytic capacitor 403, and a switch circuit 404, etc., as shown in FIG. 46. Such flash devices are configured so that the xenon tube 401 emits light by transforming an electric charge charged in the aluminum electrolytic capacitor 403 into an electric current with switching operation using the inverter 402.

SUMMARY

However, the conventional flash devices require some time for charge completion of the aluminum electrolytic capacitor 403 after once emitting light. Therefore, there is a problem that continuous light emitting is difficult and thus continuous lighting is impossible.

Since the conventional flash devices use the xenon tube, it requires a plastic protection for a measure against high voltages, the volume capacity thereof is increased, and therefore it is difficult to reduce the size and weight thereof.

The object of the embodiments is to provide an LED flash module, an LED module, and an imaging device, each which can reduce the time required for electric charging under low voltage operations, and also can reduce physical size and weight thereof.

According to one aspect of the embodiments, there is provided an LED flash module comprising: a module substrate; an energy device arranged on the module substrate, the energy device including at least two layers of layered structure in which a positive electrode and a negative electrode of an active material electrode are alternately laminated so that a positive electrode and a negative electrode of extraction electrodes portions are exposed, while inserting a separator through which an electrolysis solution and ions can pass between the active material electrode portions of electrodes in which the positive and negative active material electrodes and the positive and negative extraction electrodes are integrated; an LED module arranged on the module substrate, the LED module in which a plurality of LED block units are arranged in a specific direction; the LED block units in which a plurality of LED elements emitting light using a power source supplied from the energy device are arranged in an orthogonal direction to the specific direction; a charger circuit disposed on the module substrate, the charger circuit configured to charge the energy device; and a control circuit disposed on the module substrate, the control circuit configured to control light emission from the LED element, wherein a wire length from a plus terminal of the power supply unit to the LED element and a wire length from the LED element to a minus terminal of the power supply unit supplying the power source to each LED element are substantially equivalent with respect to each LED element.

According to another aspect of the embodiments, there is provided an LED module comprising: an LED block unit in which a plurality of LED elements arranged in a specific direction, wherein a plurality of the LED block units are arranged in an orthogonal direction with respect to the specific direction and a wire length from a plus terminal of the power supply unit to the LED element and a wire length from the LED element to a minus terminal of the power supply unit supplying the power source to each LED element are substantially equivalent with respect to each LED element.

According to still another aspect of the embodiments, there is provided an imaging device comprising: the LED flash module according to claim 1 mounted thereon.

According to the embodiments, there can be provided the LED flash module, the LED module, and the imaging device, each which can reduce the time required for electric charging under low voltage operations, and also can reduce physical size and weight thereof.

DESCRIPTION OF EMBODIMENTS

Figure 1A:
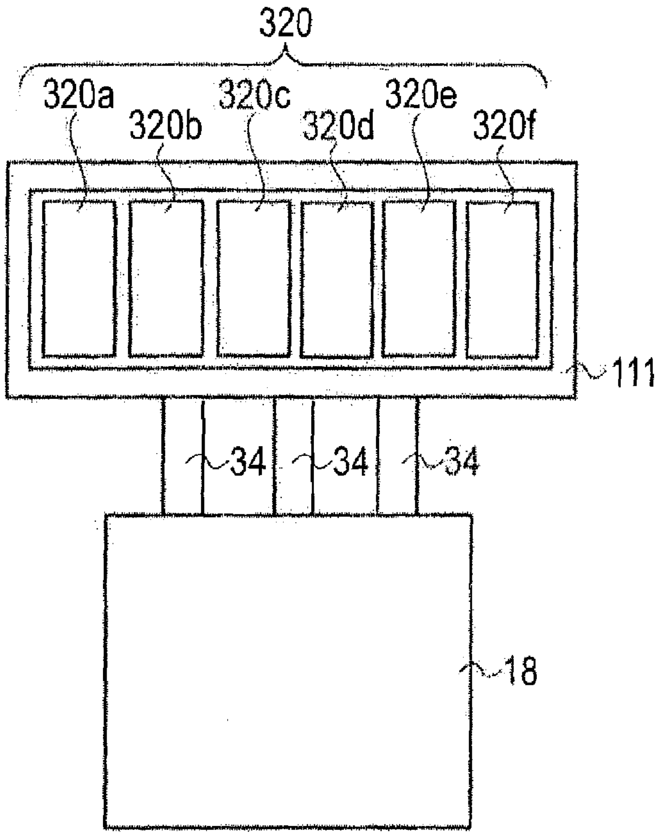
FIG. 1A is a schematic top view diagram of an LED flash module according to a first embodiment, viewed from a front side thereof.

Next, the embodiments described herein will be described with reference to drawings. In the description of the following drawings, the identical or similar reference numeral is attached to the identical or similar part. However, it should be noted that the drawings are schematic and the relation between thickness and the plane size and the ratio of the thickness of each component part differs from an actual thing. Therefore, detailed thickness and size should be determined in consideration of the following explanation. Of course, the part from which the relation and ratio of a mutual size differ also in mutually drawings is included.

Moreover, the embodiments described hereinafter exemplifies the apparatus and method for materializing the technical idea; and the embodiments do not specify the material, shape, structure, placement, etc. of each component part as the following. The embodiments may be changed without departing from the spirit or scope of claims.

First Embodiment

Hereinafter, a first embodiment will be described with reference to FIGS. 1-8.

(Configuration of LED Flash Module)

An LED flash module according to a first embodiment includes: a module substrate 111; an energy device (e.g., Electric Double-Layer Capacitor (EDLC)) 18 arranged on the module substrate 111, the energy device 18 including at least two layers of layered structure in which a positive electrode and a negative electrode of an active material electrode are alternately laminated so that a positive electrode and a negative electrode of extraction electrodes 34 portions are exposed, while inserting a separator 30 through which an electrolysis solution and ions can pass between the active material electrode portions of electrodes in which the positive and negative active material electrodes and the positive and negative extraction electrodes 34 are integrated; an LED module 320 arranged on the module substrate 111, the LED module 320 in which a plurality of LED block units 320*a* to 320*f* are horizontally arranged (in a specific direction), the LED block units 320*a* to 320*f* in which a plurality of LED elements emitting light using a power source supplied from the energy device 18 are arranged vertically (in an orthogonal direction with respect to the specific direction); an EDLC charger circuit 311 disposed on the module substrate 111, the EDLC charger circuit 311 configured to charge the energy device 18; and an LED driver control circuit 313 disposed on the module substrate 111, the LED driver control circuit 313 configured to control light emission from the LED element, wherein a wire length from a plus terminal 321 of the power supply unit to the LED element and a wire length from the LED element to a minus terminal 322 of the power supply unit supplying the power source to each LED element are substantially equivalent with respect to each LED element.

Moreover, wiring patterns 321*a* and 322*a* of the LED block units 320*a* to 320*f* may be configured with a comb-shaped combination.

Moreover, the LED module 320 may be mounted on the surface of the module substrate 111. The EDLC charger circuit 311 and the LED driver control circuit 313 may be mounted on the back side surface of the module substrate 111.

Moreover, the LED driver control circuit 313 may selectively light a desired LED element(s) among the plurality of the LED elements.

Figure 1B:
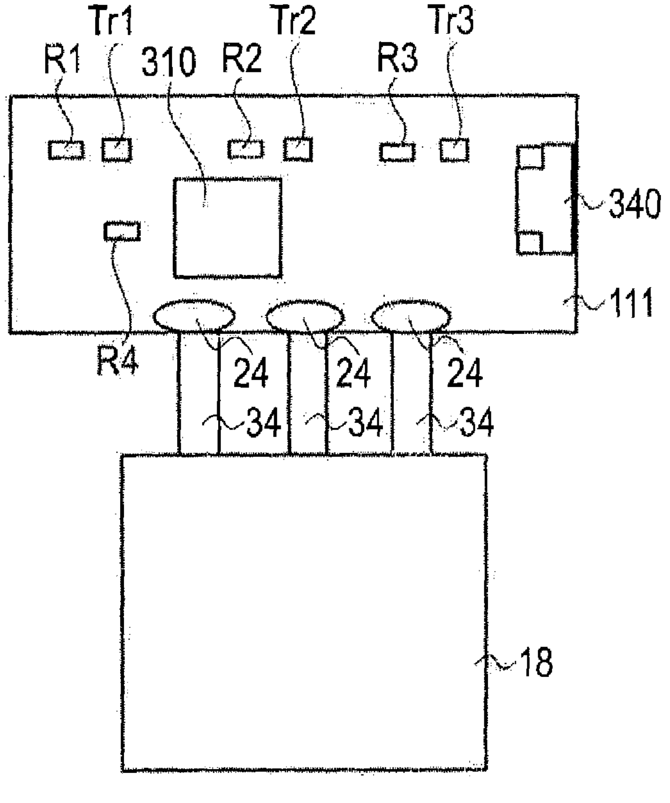
FIG. 1B is a schematic top view diagram of the LED flash module according to the first embodiment, viewed from a back side thereof.

FIG. 1A is a schematic top view diagram of the LED flash module according to the first embodiment, viewed from the front side thereof, and FIG. 1B is a diagram of the LED flash module viewed from the back side thereof. As shown in FIG. 1A, the LED module 320 is mounted on the surface of the module substrate 111. The LED module 320 is composed of six LED block units 320*a* to 320*f* arranged horizontally (side-by-side). Each LED block unit 320*a* to 320*f* is composed of a plurality of the LED elements arranged vertically, and the detailed configuration thereof will be described later. Although the configuration of horizontally arranging the six LED block units 320*a* to 320*fy* is illustrated herein, it is needless to say that the number of the LED block units included in one LED module 320 may not be limited. For example, seven LED block units may be arranged thereon. On the other hand, as shown in FIG. 1B, the electronic components including the LED flash driver 310, external transistors Tr1 to Tr3, external resistors R1 to R3, and connector 340, etc. are mounted on the back side surface of the module substrate 111. The extraction electrode 34 of the energy device 18 is welded to a soldered part 24 of the module substrate 111. The energy device 18 is a laminated type energy device, e.g. EDLC, for example. The EDLC is capable of bearing rapid charging/discharging compared with secondary batteries utilizing chemical reactions, since the EDLC stores electricity using an electric double layer formed on an interface between the electrode and the electrolysis solution.

Figure 2:
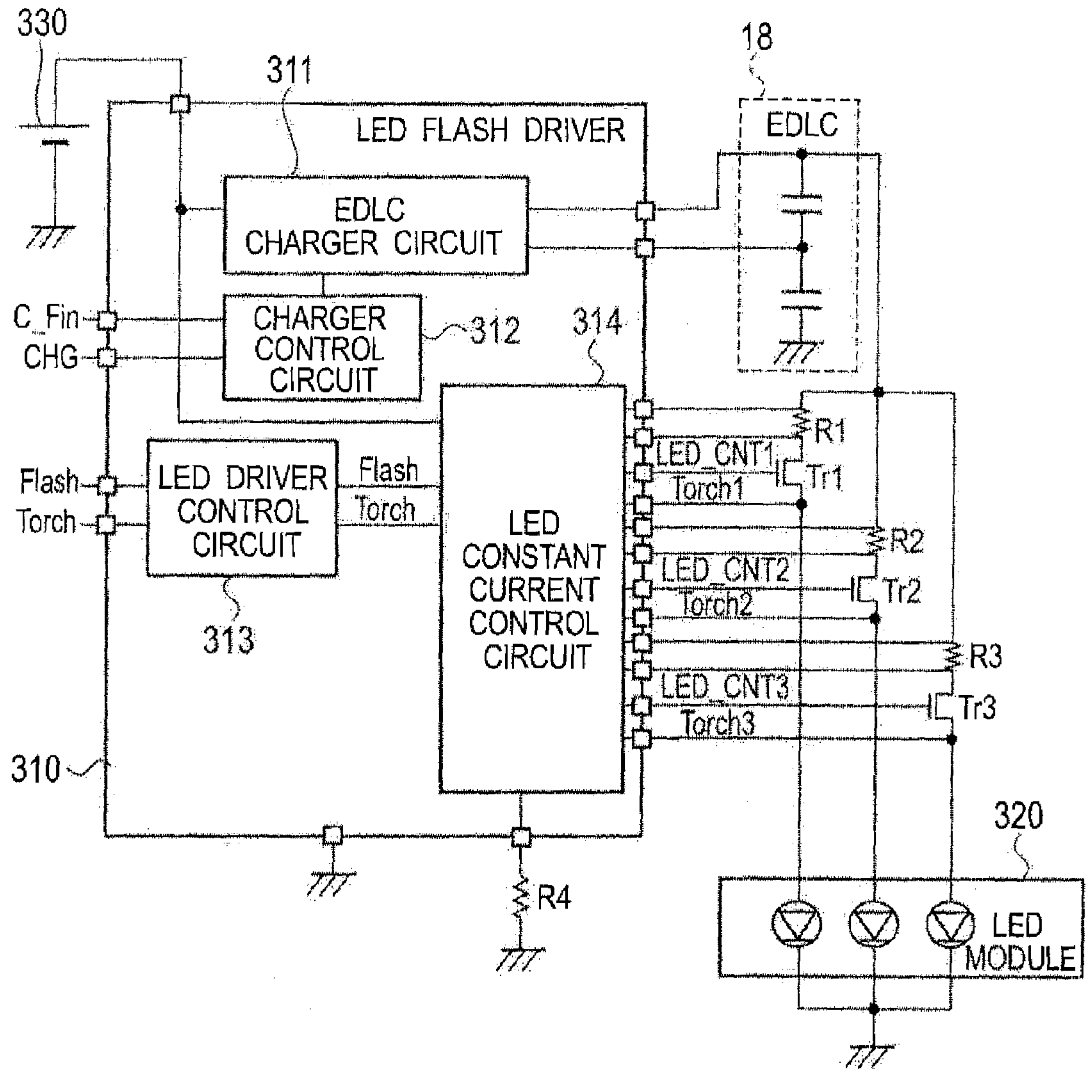
FIG. 2 is a schematic circuit block configuration diagram of the LED flash module according to the first embodiment.

FIG. 2 is a schematic block configuration diagram of the LED flash module according to the first embodiment. As shown in FIG. 2, the LED flash driver 310 includes: an EDLC charger circuit 311, a charger control circuit 312, an LED driver control circuit 313, and an LED constant current control circuit 314. The EDLC charger circuit 311 charges the energy device 18 using a power source supplied from a battery 330. The charger control circuit 312 controls the EDLC charger circuit 311 on the basis of a CHG signal or a C_Fin signal. The LED driver control circuit 313 controls light emitted from the LED element on the basis of a Flash signal or a Torch signal. It is also possible to selectively light a desired LED element in every LED block units among the plurality of the LED elements. The LED constant current control circuit 314 performs constant current drive of the LED module 320 using the power source supplied from the battery 330.

(Operation of LED Flash Module)

First, an operation at the time of charging the energy device 18 will now be explained. The EDLC charger circuit 311 in the LED flash driver 310 charges the energy device 18 using the power source supplied from the battery 330 (Step S1 in FIG. 3A). The CHG signal and the C_Fin signal are input into the charger control circuit 312. When the CHG signal is input into the charger control circuit 312, the charger control circuit 312 is configured to turn ON/OFF of charging. When the charging of the energy device 18 is completed, a flag will be output from the C_Fin signal (Step S2 in FIG. 3A). If the energy device 18 is in the charging state, the LED module 320 does not emit light.

Next, an operation at the time of an LED flash mode will now be explained. If the Flash signal is input therein in the charge completion state of the energy device 18, the external transistors Tr1 to Tr3 are turned ON in response to LED_CNT1 signal to LED_CNT3 signal, the electric current flows into the LED module 320, and then the LED flash will light (Step S3 in FIG. 3A). At this time, charge of the energy device 18 has already been turned OFF state in response to the CHO signal. The electric current at the time of the LED flash is controlled by the external resistors R1 to R3.

Figure 3A:
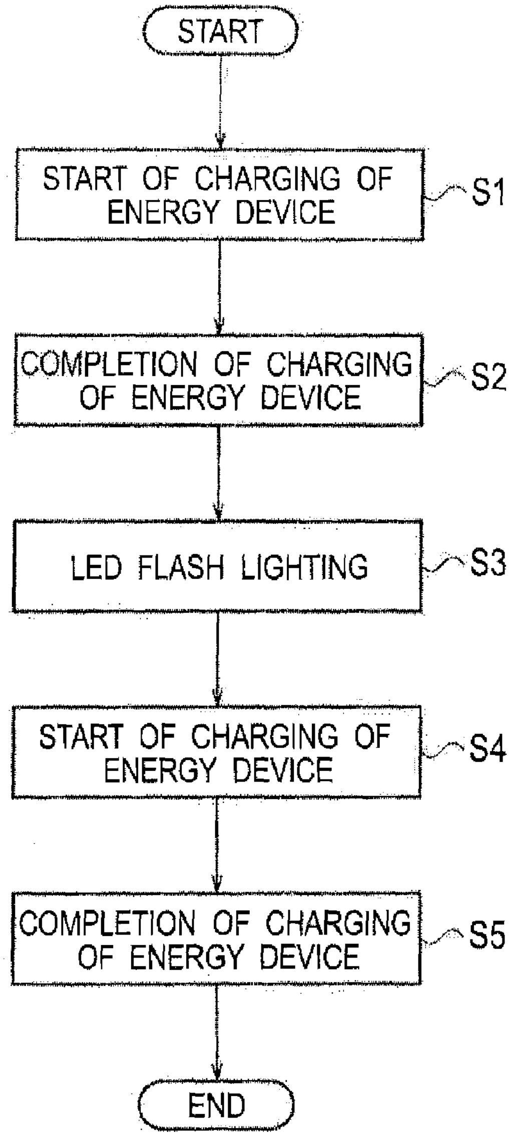
FIG. 3A is a flow chart for explaining an operation at the time of charging of an energy device, in the LED flash module according to the first embodiment.
Figure 3B:
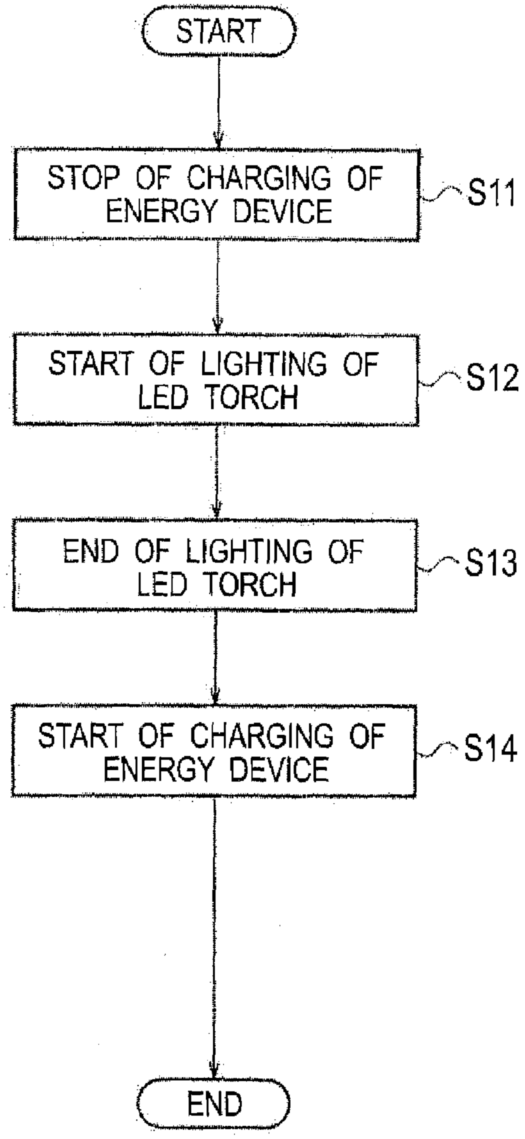
FIG. 3B is a flow chart for explaining an operation at the time of an LED torch mode, in the LED flash module according to the first embodiment.

After the flash operation in Step S3 is completed, the charging operation of the energy device 18 is started in the same operation as that in Step S1 (Step S4 in FIG. 3A). Subsequently, when the charging of the energy device 18 is completed, the charging operation of the energy device 18 is completed in the same operation as that in Step S1 (Step S5 in FIG. 3A).

Next, an operation at the time of an LED torch mode will now be explained. The LED constant current control circuit 314 in the LED flash driver 310 performs constant current drive of the LED module 320 using the power source supplied from the battery 330 (Step S12 in FIG. 3B). At this time, the external transistors Tr1, Tr2, Tr13 have already been in the OFF state in response to the LED_CNT1 signal, LED_CNT2 signal, and LED_CNT3 signal. The electric current used for the LED torch is controlled by the external resistor R4. It is more preferable to avoid lighting of the LED torch during the charging of the energy device 18, since the voltage of the battery 330 will be reduced too much. Accordingly, the charging of the EDLC is stopped before starting the LED torch lighting (Step S11→S12 in FIG. 3B), and the charging of the EDLC is started after the LED torch lighting is completed (Step S13→S14 in FIG. 3B).

(Configuration of LED Module)

Figure 4A:
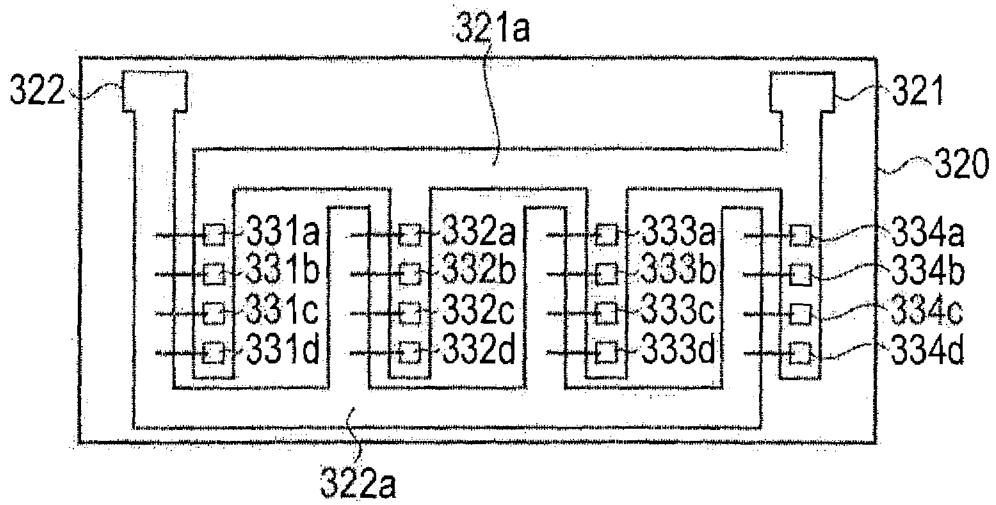
FIG. 4A is a schematic top view diagram of an LED module according to the first embodiment; and is in particular a diagram for explaining a configuration of an LED block unit.

The LED module 320 according to the first embodiment has a configuration of horizontally arranging the plurality of the LED block units in which the plurality of the LED elements are vertically arranged, as shown in FIG. 4A. In this embodiment, a different LED block unit is composed for each of the LED elements 331*a*-331*d*, the LED elements 332*a*-332*d*, the LED elements 333*a*-333*d*, and the LED elements 334*a*-334*d*. A COB (Chip on Board) structure is adopted in the embodiments described herein. COB structure corresponds to a structure of directly mounting a bare chip (an LED element itself) on wiring patterns on the module substrate, performing wire bonding, and performing a resin seal.

Moreover, the LED module 320 according to the first embodiment includes a first wiring pattern 321*a* and a second wiring pattern 322*a* each combined with a comb structure, as shown in FIG. 4A. The LED elements 331*a*-331*d*, 332*a*-332*d*, 333*a*-333*d*, 334*a*-334*d* are mounted on the first wiring pattern 321*a*, and are connected to the second wiring pattern 322*a* by wire bonding.

As shown in FIG. 4A, the wiring patterns 321*a*, 322*a* are configured to be combined with the comb structure. That is, the comb-shaped wiring pattern 321*a* is formed in a downward direction from the plus terminal 321 of the power supply unit, and the LED elements 331*a*-331*d*, 332*a*-332*d*, 333*a*-333*d*, 334*a*-334*d* are mounted on the comb-teeth portion of the wiring pattern 321*a*. Moreover, the comb-shaped wiring pattern 322*a* is formed in a upward direction from the minus terminal 322 of the power supply unit, and the comb-teeth portion of the wiring pattern 322*a* is connected to the LED elements 331*a*-331*d*, 332*a*-332*d*, 333*a*-333*d*, 334*a*-334*d* by wire bonding.

The LED module 320 according to the first embodiment corresponds to a single wire type bonding, as shown in FIG. 4A.

Figure 4B:
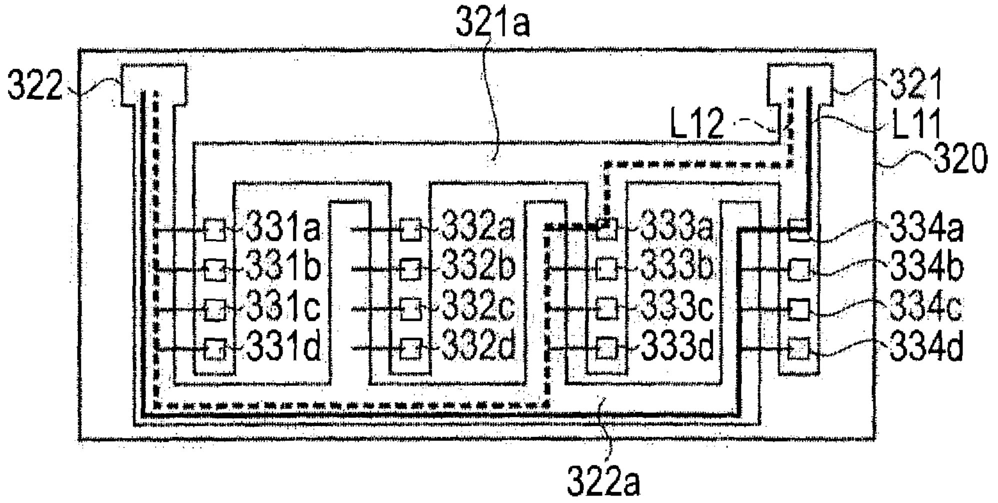
FIG. 4B is a schematic top view diagram of an LED module according to the first embodiment; and is in particular a diagram for explaining a wire length.
Figure 5:
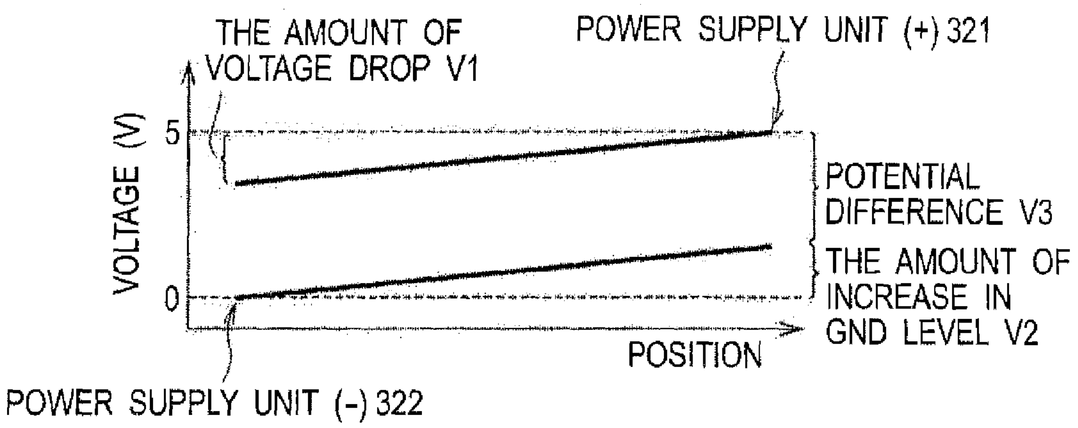
FIG. 5 is a diagram for explaining a potential difference between a power supply unit (+) and a power supply unit (−) according to the first embodiment.

Thus, the wire length from the plus terminal 321 of the power supply unit to the LED elements and the wire length from the LED elements to the minus terminal 322 of the power supply unit become approximately equal with respect to each LED element. For example, the solid line L11 shows the wiring pattern for the LED element 334*a*, and the dotted line L12 shows the wiring pattern for the LED element 333*a*, as shown in FIG. 4B. As proved also in FIG. 4B, the length of the solid line L11 and the length of the dotted line L12 is substantially equal to each other. In other words, the total length of each wiring in which the electric current flows for each LED element is approximately equal to each other. Accordingly, as shown in FIG. 5, the variation amount of the voltage drop V1 is approximately same as the variation amount of increase in GND level V2, and therefore the potential difference V3 between the power supply unit (−) 322 and the power supply unit (+) 321 is constant in each position. Consequently, it becomes possible to make each LED element emit light with equivalent lightness since the voltage applied to each LED element is constant.

(Configuration of LED Block Unit in LED Module)

Figure 6:
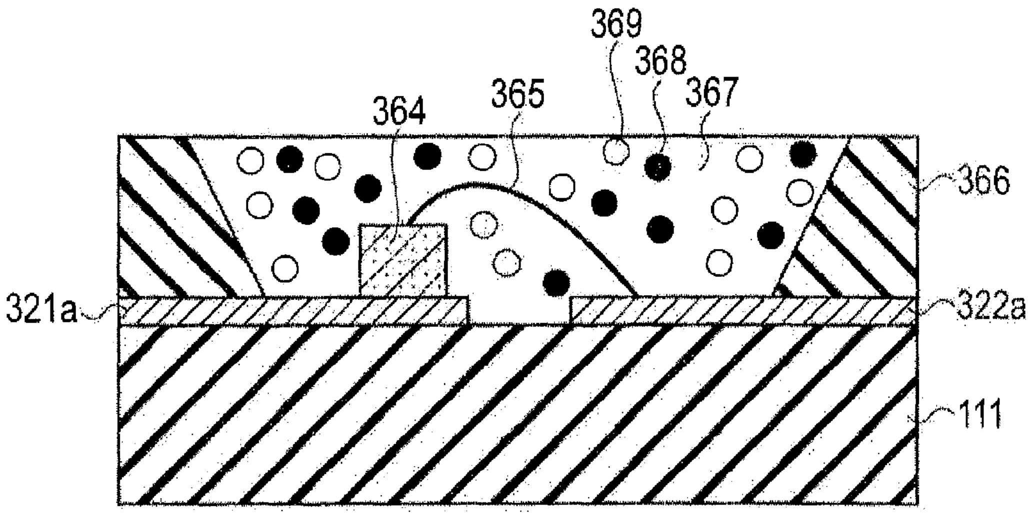
FIG. 6 shows a schematic cross-sectional structure example of the LED block unit in the LED module according to the first embodiment.

FIG. 6 shows a schematic cross-sectional structure example of the LED block unit in the LED module according to the first embodiment. In FIG. 6, the cross-sectional structure in the state where the LED element 364 is mounted on the module substrate 111. As shown in FIG. 6, the wiring patterns

321*a*, 322*a* are formed on the module substrate 111. The LED element 364 is mounted on the wiring pattern 321*a*, and an upper surface electrode (not shown) of the LED element 364 is connected to the wiring pattern 322*a* by the bonding wire 365. On the inside of a white resin bank (dam material) 366, there is provided a phosphor layer 367 in which a first light-emitting phosphor 368 and a second light-emitting phosphor 369 are mixed and dispersed in an optical transparency resin.

For example, the LED element 364 may be formed of a blue LED formed of a nitride based semiconductor. In this case, each the first light-emitting phosphor 368 and the second light-emitting phosphor 369 may be formed of a yellow phosphor. Alternatively, in order to ensure color rendering properties, the first light-emitting phosphor 368 may be formed of a red phosphor, and the second light-emitting phosphor 369 may be formed of a green phosphor.

In this embodiment, a Ce doped YAG ($Y_3Al_5O_{12}$:Ce) phosphor, an Eu doped α-sialon (CaSiAlON:Eu) phosphor, a silicate phosphor (Sr, Ba, Ca, Mg) ($_2SiO_4$:Eu), etc. can be used, as a yellow phosphor using the blue LED as an excitation light source, for example. That is, a part of the blue light of blue LED is converted into a yellow light emission with the yellow phosphor, and then a white light emission can be obtained by superposing a yellow light on a blue light.

Moreover, an Eu doped β-sialon ($Si_{6-z}Al_zO_zN_{8-z}$:Eu) phosphor, a Ce doped CSSO ($Ca_3Sc_2Si_3O_{12}$:Ce) phosphor, etc. can be used, as the green phosphor using the blue LED as an excitation light source, for example.

Moreover, an Eu doped $CaAlSiN_3$ ($CaAlSiN_3$:Eu) phosphor etc. can be used, as the red phosphor using the blue LED as an excitation light source, for example.

Moreover, the LED element 364 may be formed of an ultraviolet LED formed of a nitride based semiconductor. In this case, each of the first light-emitting phosphor 368 and the second light-emitting phosphor 369 may be formed with a yellow phosphor. Alternatively, in order to ensure color rendering properties, the first light-emitting phosphor 368 may be formed with a blue phosphor, and the second light-emitting phosphor 369 may be formed with a yellow phosphor.

Phosphors for emitting blue light by receiving ultraviolet light, e.g., a halogen acid salt phosphor, an aluminate phosphor, a silicate phosphor, etc. can be used as the blue phosphor using the ultraviolet LED as an excitation light source. Moreover, as an activator, there can be listed elements, e.g. cerium, europium, manganese, gadolinium, samarium, terbium, tin, chromium, and antimony, for example. In particular, europium is preferred as an activator. The additive amount of the activator is preferred to be in a range from 0.1 to 10 mol % with respect to the phosphor.

Phosphors which absorb the blue light to emit light in yellow, or phosphor which absorb the ultraviolet light to emit light in yellow can be used as a yellow phosphor using the ultraviolet ZED as an excitation light source. In this embodiment, when the first light-emitting phosphor 368 is formed of the blue phosphor and the second light-emitting phosphor 369 is formed of the yellow phosphor in order to ensure color rendering properties, a phosphor which absorbs the ultraviolet light to emit light in yellow is preferable, in order to further improve light emitting efficiency. As a phosphor which absorbs the blue light to emit light in yellow, an allylsulfo amide melamine-formaldehyde co-condensation dyed material, a perylene based phosphor, etc. can be listed in organic phosphors, and aluminate, phosphate, silicate, etc. can be listed in inorganic phosphors, for example. In particular, the perylene based phosphor and the YAG based phosphor are preferred from a point of long-time use. Moreover, as an activator, there can be listed elements, e.g. cerium, europium, manganese, gadolinium, samarium, terbium, tin, chromium, and antimony, for example. In particular, cerium is preferred as an activator. The additive amount of the activator is preferred in a range from 0.1 to 10 mol % with respect to the phosphor. As a combination of the phosphor and the activator, it is preferred to combine the YAG and the cerium.

As the phosphor which absorbs ultraviolet light to emit light in yellow, phosphors, e.g. (La,Ce), $(P,Si)O_4$ and (Zn,Mg) O, can be listed, for example. Moreover, as the activator, terbium, zinc, etc. can be listed, for example.

The contained amount of the first light-emitting phosphor 368 and the second light-emitting phosphor 369 in the phosphor layer 367 may be appropriately determined on the basis of a kind of the LED element 364, a kind of the phosphor, etc. However, the contained amount of each phosphor is generally preferred to be in a range from 1 to 25 wt % with respect to the phosphor layer 367.

The white LED to be installed in the LED flash module according to the first embodiment may be housed in a general-purpose package for mounting LED.

As a configuration of the LED, "a blue LED+a green LED+a red LED" can be housed in one package in order to composing the white LED, for example. As an example of such a multichip, a phosphor which emits light in yellow light by blue light excitation is also combinable into a multichip of "an infrared LED a blue LED." The yellow phosphor can be composed with one compact package since it is not affected by the infrared light, thereby reducing the occupancy space, and mounting the LED in the smaller space.

(Fabrication Method of LED Module)

FIG. 7 is a schematic top view diagram for explaining a fabrication method of the LED module according to the first embodiment. In FIG. 7, the quadrangular box indicates the LED element, the hatching region indicates the phosphor layer 367, and the solid arrow indicates a coating path of the white resin bank 366. The height of the white resin bank 366 is approximately from 0.5 to 2.0 mm, and the width of the white resin bank 366 is approximately from 0.5 to 1.0 mm.

Figure 7A:
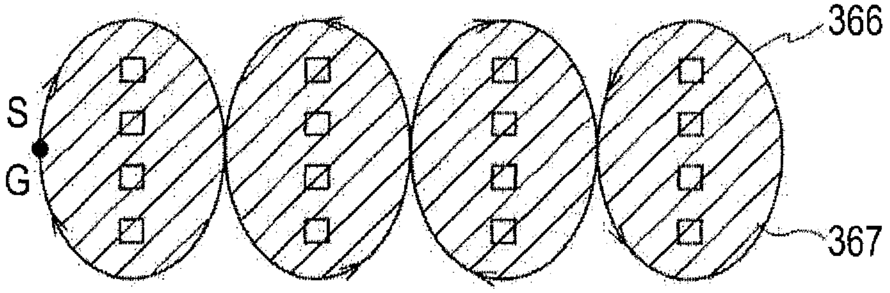
FIG. 7A shows a schematic plane configuration for explaining a fabrication method of the LED module according to the first embodiment; and is in particular a schematic plane configuration diagram showing an aspect that a white resin bank is coated in an 8-shape around each LED element so that a closed region is formed on each LED block unit, and a phosphor layer is coated in each 8-shaped bank.
Figure 7B:
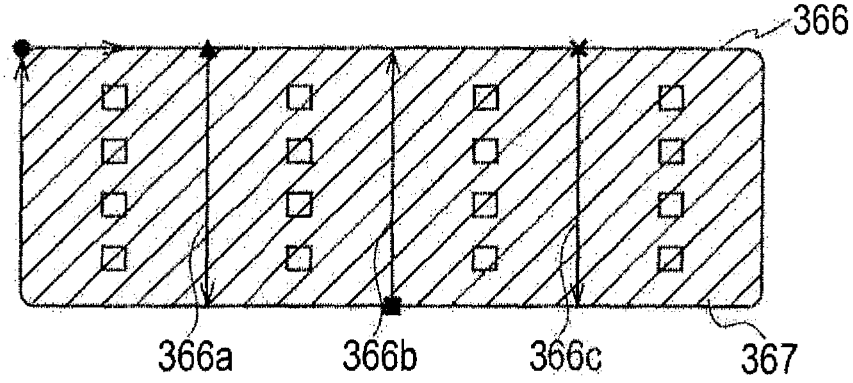
FIG. 7B shows a schematic plane configuration for explaining a fabrication method of the LED module according to the first embodiment; and is in particular a schematic plane configuration diagram showing an aspect that a white resin bank is coated in a rectangle shape around each LED element, a bank used as a partition is coated in the rectangular banks so that a closed region is formed on each LED block unit, and a phosphor layer is coated on each partitioned bank.
Figure 7C:
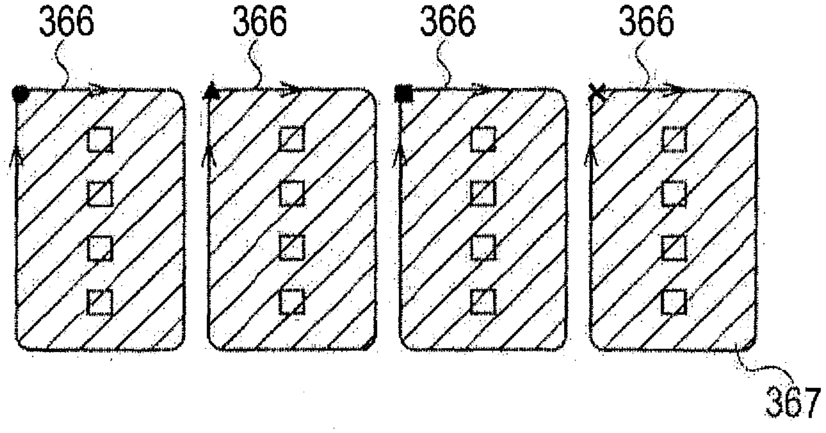
FIG. 7C shows a schematic plane configuration for explaining a fabrication method of the LED module according to the first embodiment; and is in particular a schematic plane configuration diagram showing an aspect that a white resin bank is coated in a rectangle shape around each LED element so that a closed region is formed on each LED block unit, and a phosphor layer is coated in each rectangle-shaped bank.

For example, as shown in FIG. 7A, the white resin bank 366 may be coated in 8-shape around the LED element so as to form a closed region in each LED block unit, and the phosphor layer 367 may be coated on the inside of the 8-shaped bank 366. Alternatively, as shown in FIG. 7B, the white resin bank 366 may be coated in a rectangle shape around the LED element, the banks 366*a*-366*c* used as a partition may be coated in the rectangular bank 366 so as to form closed regions in each LED block unit, and then the phosphor layer 367 may be coated on the inside of each partitioned bank 366, 366*a*, 366*b*, 366*c*. Alternatively, as shown in FIG. 7C, the white resin bank 366 may be coated in a rectangle shape around the LED element so as to form a closed region in each LED block unit, and the phosphor layer 367 may be coated on the inside of the rectangle shaped bank 366.

As explained above, according to the LED flash module according to the embodiments described herein, since the energy devices 18, e.g. EDLC is used, the time required for charging can be shortened and thereby the continuous light emitting and the continuous lighting are possible. Moreover, lower operating voltages and energy saving are realizable by using the energy device 18. Furthermore, it is possible to provide a compact LED flash module since the energy device 18 has a thin shape.

Moreover, the LED flash module according to the embodiments described herein is laid out so that the wire length from the plus terminal 321 of the power supply unit to the LED element is approximately equal to the wire length from the LED element to the minus terminal 322 of the power supply unit with respect to each LED element. Accordingly, it is possible to make each LED element emit light with equivalent lightness, since the amount of the voltage drop due to the wiring in each LED element is approximately equal to each other.

Figure 8A:
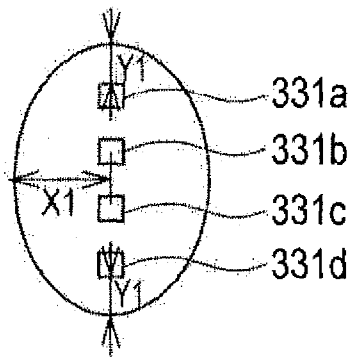
FIG. 8A is a diagram for explaining an effect of the LED flash module according to the first embodiment; and is in particular a schematic top view diagram of one LED block unit.
Figure 8B:
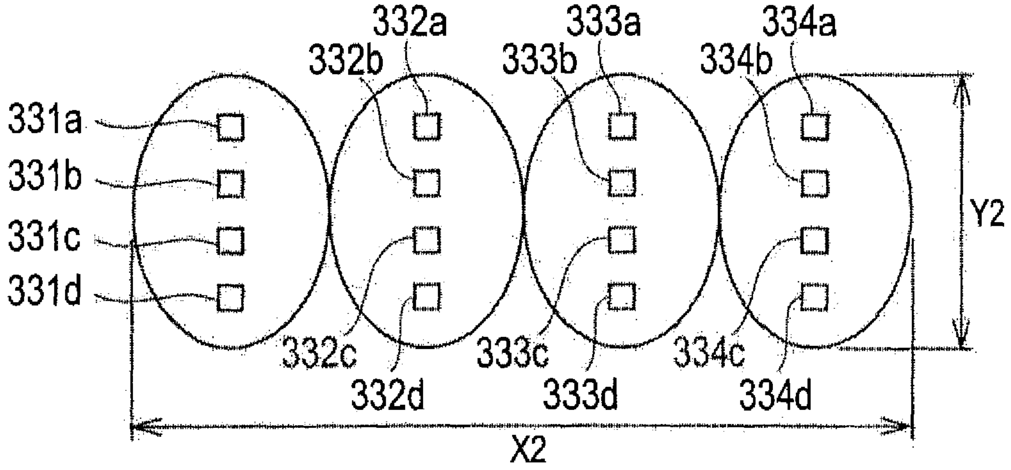
FIG. 8B is a diagram for explaining an effect of the LED flash module according to the first embodiment; and is in particular a schematic top view diagram showing the state where four LED block units are arranged thereon.

Moreover, the LED flash module according to the embodiments described herein has the block configuration of arranging the LED elements vertically. Accordingly, as shown in FIG. 8A, the spread X1 of the interrelationship between the adjacent LED elements is larger than the spread Y1 of one LED element. Thus, as shown in FIG. 8B, the illuminating angle in the horizontal direction can be widen than that in the vertical direction (Y2<X2). It is possible to easily support wider angles, e.g. 16:9 aspect ratio, by arranging the required number of the LED block units.

In the LED flash module according to the first embodiment, since the thin type energy device, e.g. EDLC, is adopted, the volume ratio thereof is approximately from 20% to 25% compared with that of the conventional type xenon tube methods, thereby reducing the physical size and weight thereof.

Moreover, in the LED flash module according to the first embodiment, the time required for the charging can be shortened due to the low voltage operation by using the LED module and the energy device, e.g. EDLC.

Second Embodiment

Hereinafter, a second embodiment will be described focusing on a different point from the first embodiment.

Figure 9A:
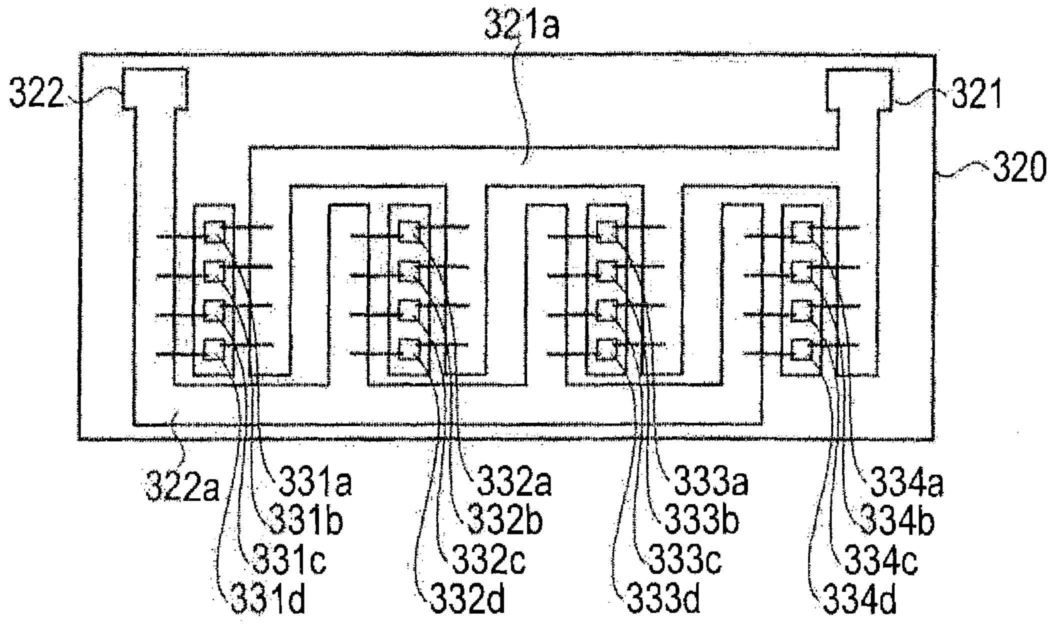
FIG. 9A is a schematic top view diagram of an LED module according to a second embodiment; and is in particular a diagram for explaining a configuration of an LED block unit.

The LED module 320 according to the second embodiment has a configuration of horizontally arranging the plurality of the LED block units in which the plurality of the LED elements are vertically arranged, as shown in FIG. 9A. Also in the second embodiment, one LED block unit is composed for each of the LED elements 331*a*-331*d*, the LED elements 332*a*-332*d*, the LED elements 333*a*-333*d*, and the LED elements 334*a*-334*d*, in the same manner as the first embodiment.

Moreover, the LED module 320 according to the second embodiment includes a first wiring pattern 321*a* and a second wiring pattern 322*a* each combined with a comb structure, as shown in FIG. 9A. Each LED block unit has a floating island on which each of the LED elements 331*a*-331*d*, the LED elements 332*a*-332*d*, the LED elements 333*a*-333*d*, and the LED elements 334*a*-334*d* is mounted. Each LED element 331*a*-331*d*, 332*a*-332*d*, 333*a*-333*d*, 334*a*-334*d* is connected to the first wiring pattern 321*a* and the second wiring pattern 322*a* by wire bonding.

As shown in FIG. 9A, in the embodiments described herein, the wiring pattern of the LED block unit has a floating island shape, and the wiring patterns 321*a* and 322*a* for connecting the LED elements 331*a*-331*d*, 332*a*-332*d*, 333*a*-333*d*, 334*a*-334*d* by wire bonding are configured to be combined with the comb structure. That is, the respective LED elements 331*a*-331*d*, LED elements 332*a*-332*d*, LED elements 333*a*-333*d*, and LED elements 334*a*-334*d* are mounted on the respective floating island-shaped wiring patterns. Moreover, the comb-shaped wiring pattern 321*a* is formed in a downward direction from the plus terminal 321 of the power supply unit, and the comb-teeth portion of the wiring pattern 321*a* is connected to the LED elements 331*a*-331*d*, 332*a*-332*d*, 333*a*-333*d*, 334*a*-334*d* by wire bonding. Moreover, the comb-shaped wiring pattern 322*a* is formed in a upward direction from the minus terminal 322 of the power supply unit, and the comb-teeth portion of the wiring pattern 322*a* is connected to the LED elements 331*a*-331*d*, 332*a*-332*d*, 333*a*-333*d*, 334*a*-334*d* by wire bonding.

The LED module 320 according to the second embodiment corresponds to a double wire type bonding, as shown in FIG. 9A.

Figure 9B:
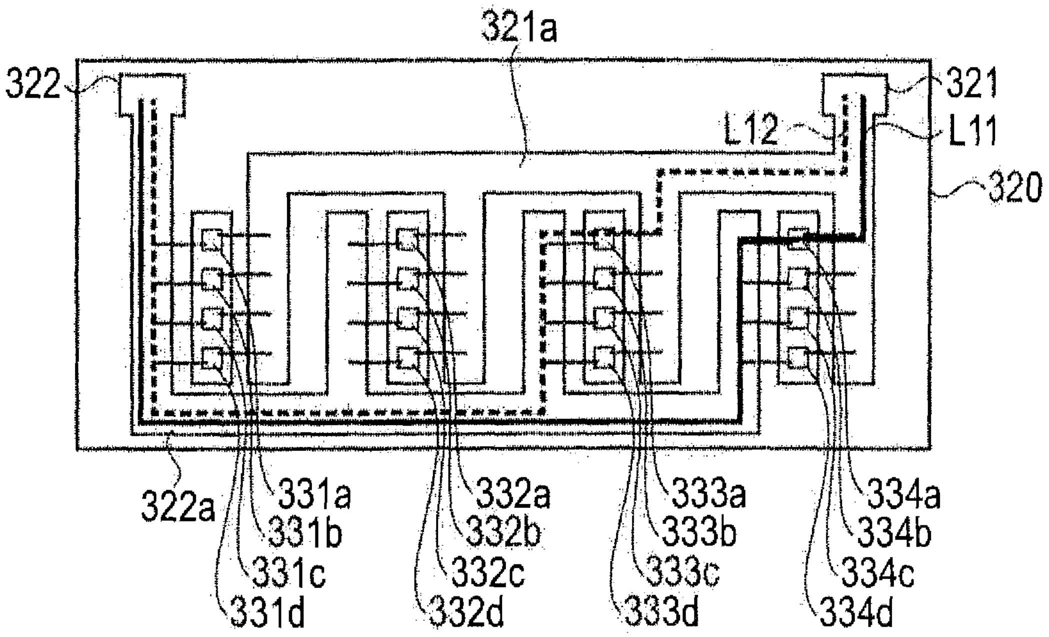
FIG. 9B is a schematic top view diagram of the LED module according to the second embodiment; and is in particular a diagram for explaining a wire length.

Thus, the wire length from the plus terminal 321 of the power supply unit to the LED elements and the wire length from the LED elements to the minus terminal 322 of the power supply unit become approximately equal with respect to each LED element. For example, the solid line L11 shows the wiring pattern for the LED element 334*a*, and the dotted line L12 shows the wiring pattern for the LED element 333*a*, as shown in FIG. 9B. As proved also in FIG. 9B, the length of the solid line L11 and the length of the dotted line L12 is substantially equal to each other. In other words, the total length of each wiring in which the electric current flows for each LED element is approximately equal to each other. Consequently, it becomes possible to make each LED element emit light with equivalent lightness since the voltage applied to each LED element is constant, as described in the first embodiment.

As explained above, in the LED flash module according to the embodiments described herein, the wiring pattern of the LED block unit has the floating island shape, and the wiring patterns 321*a* and 322*a* for connecting the LED elements 331*a*-331*d*, 332*a*-332*d*, 333*a*-333*d*, 334*a*-334*d* by wire bonding are configured to be combined with the comb structure. According to also such a configuration, the similar effect as that of the first embodiment can be obtained since the amount of the voltage drop due to the wiring in each LED element is approximately equal to each other.

In the LED flash module according to the second embodiment, thin type energy device, e.g. EDLC, is used in the same manner as the first embodiment. Accordingly, the volume ratio thereof is approximately from 20% to 25% compared with that of the conventional type xenon tube methods, thereby reducing the physical size and weight thereof.

Moreover, in the LED flash module according to the second embodiment, the time required for the charging can be shortened due to the low voltage operation by using the LED module and the energy device 18, e.g. EDLC.

Third Embodiment

Hereinafter, a third embodiment will be described focusing on a different point from the first or second embodiment, with reference to FIGS. 10-14.

(Configuration of LED Flash Module)

An LED flash module according to the third embodiment includes: a module substrate 111; an energy device (e.g., EDLC) 18 arranged on the module substrate 111, the energy device 18 including at least two layers of layered structure in which a positive electrode and a negative electrode of an active material electrode are alternately laminated so that a positive electrode and a negative electrode of extraction electrodes 34 portions are exposed, while inserting a separator 30 through which an electrolysis solution and ions can pass between the active material electrode portions of electrodes in which the positive and negative active material electrodes and the positive and negative extraction electrodes 34 are integrated; an LED module 320 arranged on the module substrate 111, the LED module 320 in which a plurality of LED block units 320*g*, 320*h* are vertically arranged (in a specific direction), the LED block units 320*a* to 320*f* in which a plurality of LED elements emitting light using a power source supplied from the energy device 18 are arranged horizontally (in an orthogonal direction with respect to the specific direction); an EDLC charger circuit 311 disposed on the module substrate 111, the EDLC charger circuit 311 configured to charge the energy device 18; and an LED driver control circuit 313 disposed on the module substrate 111, the LED driver control circuit 313 configured to control light emission from the LED element, wherein color rendering properties of the LED block units 320*g*, 320*h* are variable.

Moreover, the LED driver control circuit 313 individually drives the LED block units 320*g*, 320*h*, and may control at least one of the current values flowed into each LED block unit 320*g*, 320*h*, and lighting periods.

Figure 10A:
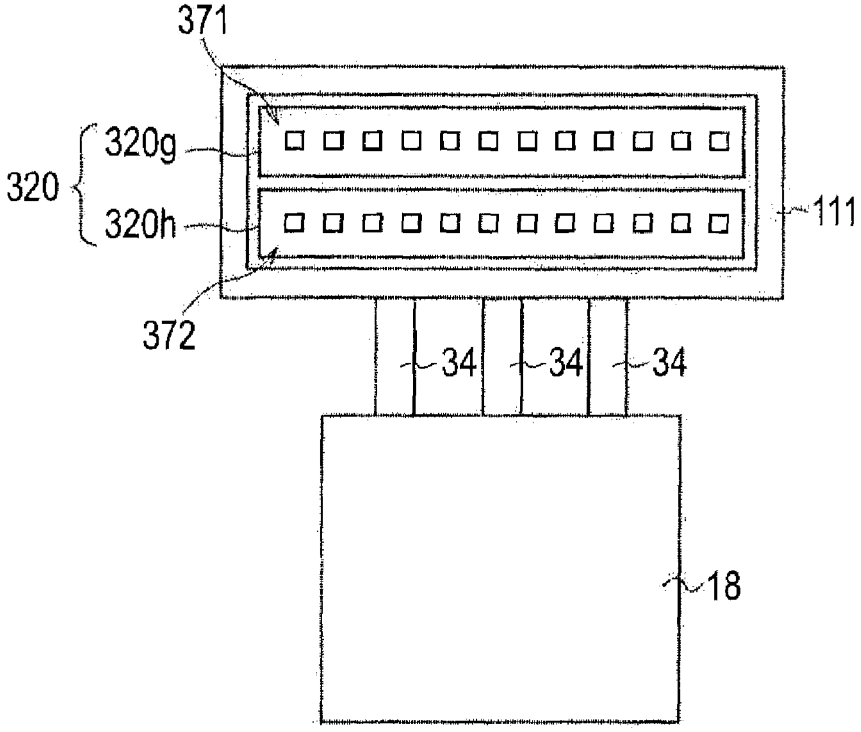
FIG. 10A is a schematic top view diagram of an LED flash module according to a third embodiment, viewed from a front side thereof.
Figure 10B:
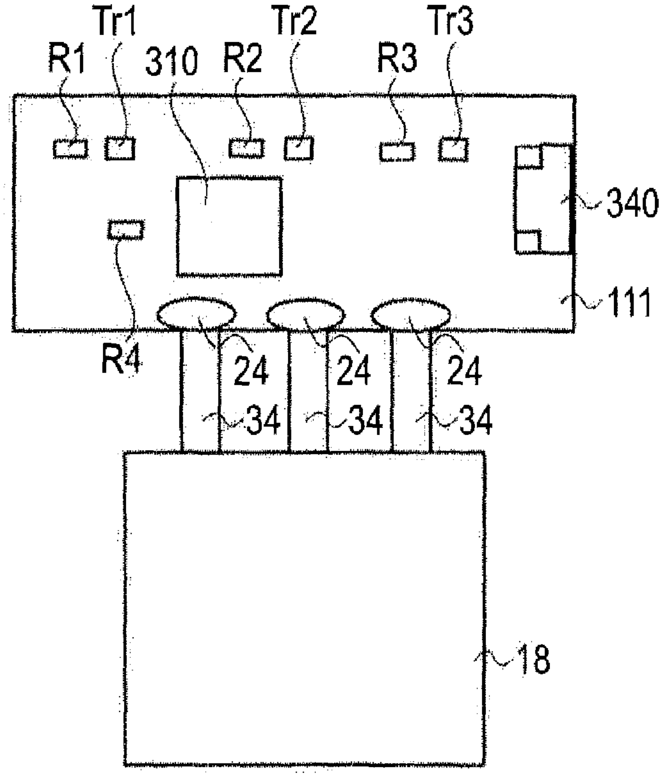
FIG. 10B is a schematic top view diagram of the LED flash module according to the third embodiment, viewed from a back side thereof.

FIG. 10A is a schematic top view diagram showing the LED flash module according to the third embodiment, viewed from the front side thereof, and FIG. 10B is a diagram showing the LED flash module viewed from the back side thereof. As shown in FIG. 10A, the LED module 320 is mounted on the surface of the module substrate 111. Two LED block units 320*g*, 320*h* are vertically arranged on the LED module 320. In each LED block unit 320*g*, 320*h*, a plurality of the LED elements are horizontally arranged. The white resin bank 366 is coated around the LED element, and the respective phosphor layers 371, 372 having different color rendering properties are coated on respective regions enclosed with the white resin bank 366 (described below). The configuration of the back side surface of the module substrate 111 is the same as that of the first embodiment, as shown in FIG. 10B.

Figure 11:
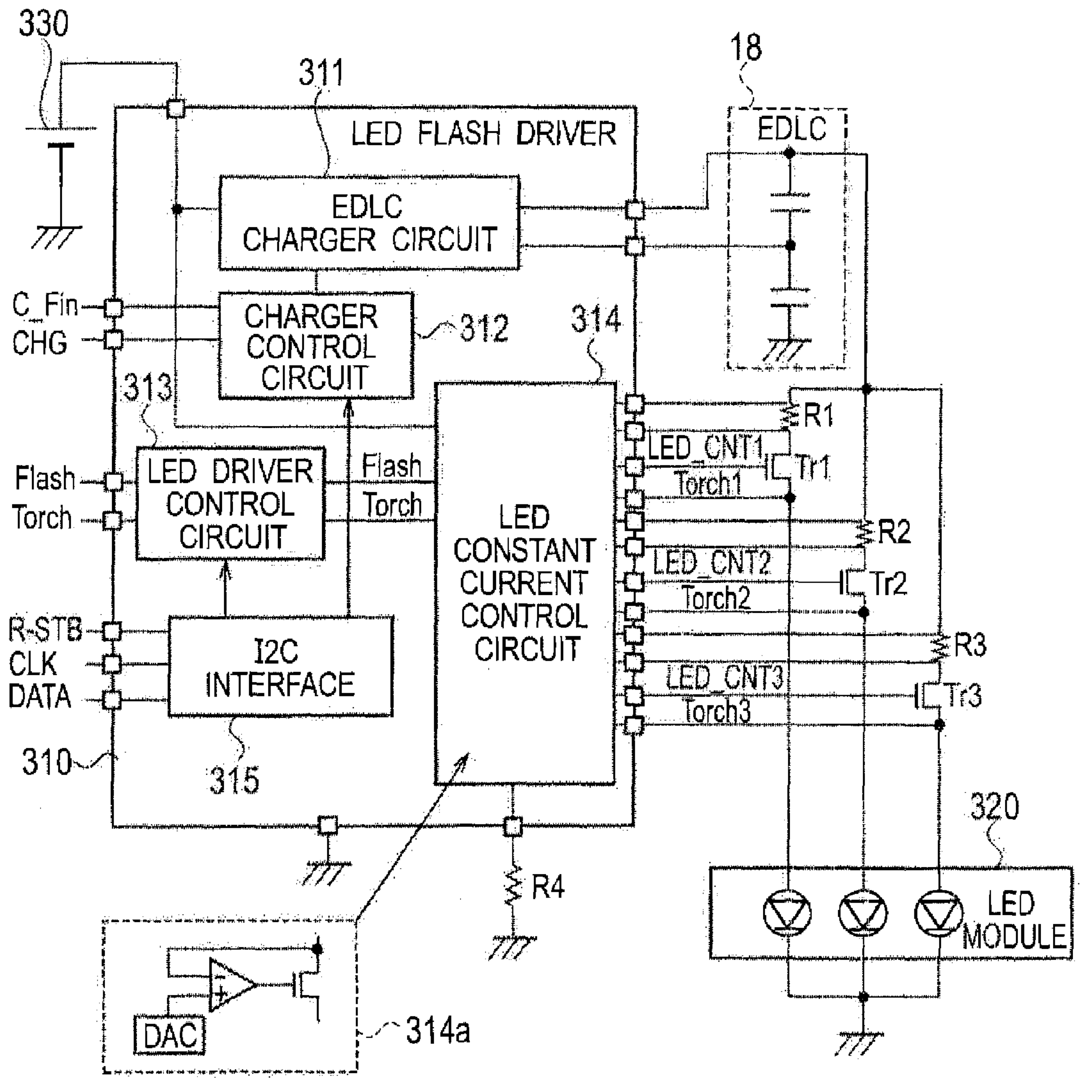
FIG. 11 is a schematic circuit block configuration diagram of the LED flash module according to the third embodiment.

FIG. 11 is a schematic block configuration diagram showing the LED flash module according to the third embodiment. The LED flash module includes an Inter-Integrated Circuit (I2C) interface 315 for communicating with a microcomputer (not shown) etc. The communication method is not limited to such an I2C. The I2C interface 315 is connected to the charger control circuit 312 and the LED driver control circuit 313. The LED driver control circuit 313 can make a desired LED element(s) selectively light in every LED block units among the plurality of the LED elements. Moreover, it is possible to also make only a specific region of the LED block unit light selectively. The LED constant current control circuit 314 includes a Digital Analog Converter (Digital Analog Converter) 314*a* in each Channel (each LED block unit). The other point is fundamentally the same as that of the first embodiment.

(Operation of LED Flash Module)

Figure 12A:
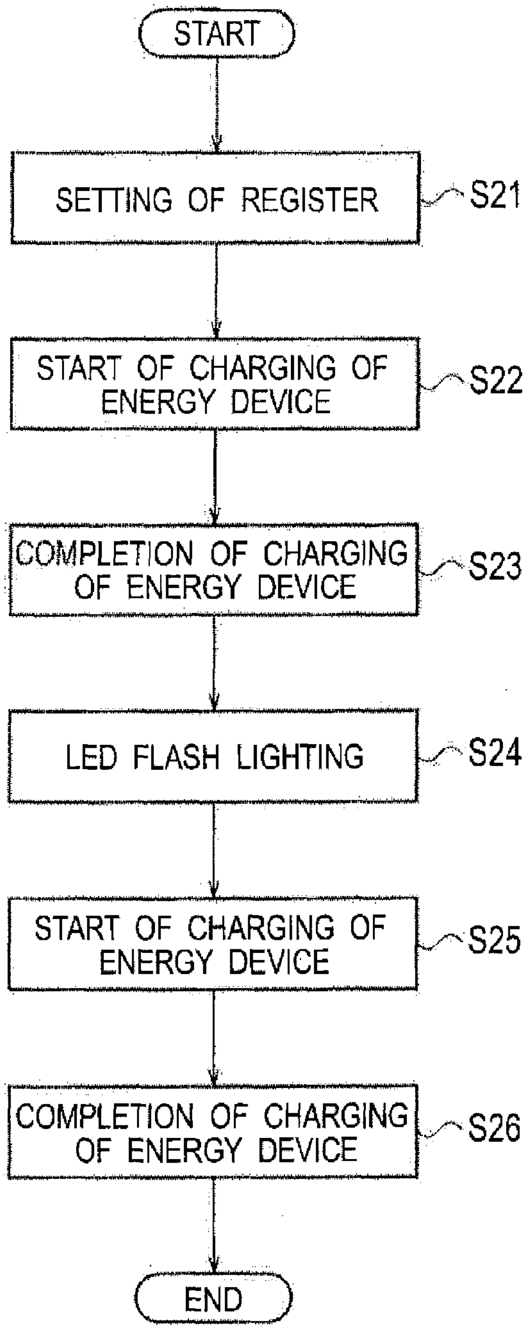
FIG. 12A is a flow chart for explaining an operation at the time of charging of an energy device, in the LED flash module according to the third embodiment.
Figure 12B:
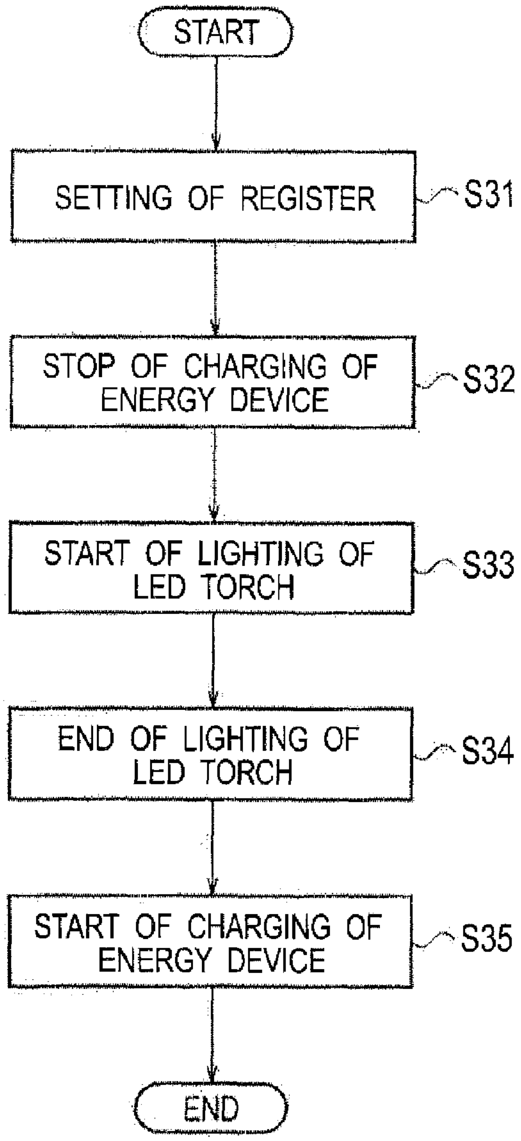
FIG. 12B is a flow chart for explaining an operation at the time of an LED torch mode, in the LED flash module according to the third embodiment.

At the time of power ON, a current value flowed into each LED block unit and a lighting period input from the microcomputer thereto, and are set in a register in the I2C interface 315 (Step S21 in FIG. 12A). Such a current value and a lighting period are appropriately determined according to a situation. Subsequently, operation until the start of lighting of the LED flash after completion of charging of energy device 18 is the same as that of the first embodiment (Steps S1-S3 in FIG. 3A) (Steps S22-S24 in FIG. 12A). The electric current at the time of the LED flash is controlled by the external resistors R1-R3 and the DAC 314*a* (Step S24 in FIG. 12A). When the flash operation of Step S24 is completed, the charging operation of the energy device 18 is started in the same manner as the first embodiment (Steps S4-S5 in FIG. 3A) (Step S25 in FIG. 12A), and then when the charging of the energy device 18 is completed, the charging operation of the energy device 18 is completed (Step S26 in FIG. 12A). On the other hand, also at the time of the LED torch, the current value and the lighting period are set in the register in the I2C interface 315 in the same manner as Step S21 (Step S31 in FIG. 12B), and the charging of the energy device 18 is stopped before starting the lighting of the LED torch (FIG. 12B, Step S32). The electric current at the time of the LED torch is controlled by the external resistor R4 and the DAC 314*a* (Steps S33-S34 in FIG. 12B). The charging of the energy device 18 is started after the lighting of LED torch is ended (Step S35 in FIG. 12B).

The LED driver control circuit 313 according to the embodiments described herein individually drives the LED block units to control the current value to be flowed to each LED block unit, and the lighting period. At that time, the LED driver control circuit 313 refers to the current value and the lighting period previously set in the register for each LED block unit. Specifically, the control of the lighting period corresponds to pulse modulations, e.g. Pulse Width Modulation (PWM), Pulse Number Modulation (PNM), etc. The LED driver control circuit controls only any one of the current value or the lighting period, but may control both thereof. For example, it is also possible to make rough adjustments using the current value, and then make fine adjustments using the lighting period.

(Configuration of LED Module)

As shown in FIG. 13, in the LED module 320 according to the third embodiment, the white resin bank 366 may be coated around each LED element, and the respective phosphor layers 371, 372 or respective phosphor layers 373-375 having different color rendering properties may be coated on respective regions enclosed with the white resin bank 366 (described below).

Figure 13A:
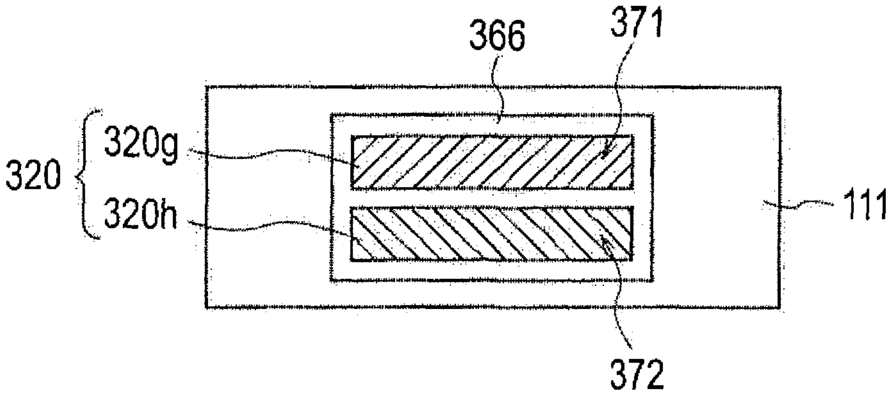
FIG. 13A is a schematic top view diagram of the LED module according to the third embodiment; and is in particular a schematic top view diagram of a rectangle type LED module.

That is, FIG. 13A is a schematic top view diagram showing a rectangle type LED module 320. In this case, FIG. 13A illustrates the configuration of vertically arranging two ZED block units 320*g*, 320*h*. The yellow phosphor layer 371 is coated on the LED block unit 320*g*, and the red and yellow phosphor layer 372 is coated on LED block unit 320*h*.

Figure 13B:
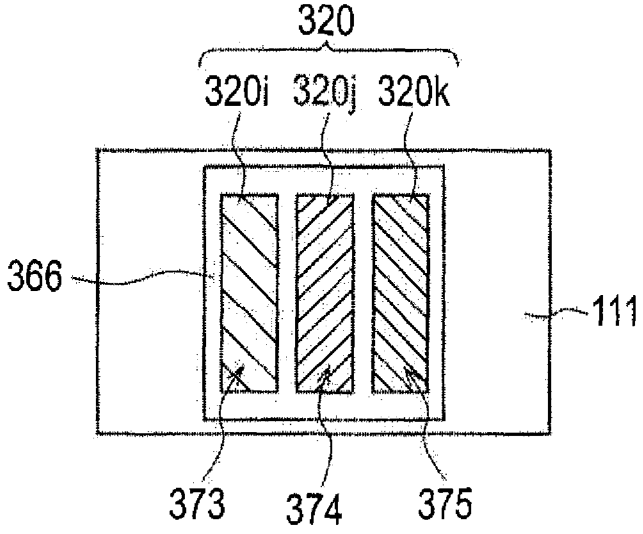
FIG. 13B is a schematic top view diagram of the LED module according to the third embodiment; and is in particular a schematic top view diagram of a four-square type LED module.

FIG. 13B is a schematic top view diagram showing a four-square type LED module 320. In this case, FIG. 13B illustrates the configuration of horizontally arranging three LED block units 320*i*, 320*j*, 320*k*. The green and yellow phosphor layer 373 is coated on the LED block unit 320*i*, the yellow phosphor layer 374 is coated on the LED block unit 320*j*, and the red and yellow phosphor layer 375 are coated on the LED block unit 320*k*.

Thus, the phosphor layers having different color rendering properties are coated on the respective LED block unit, and thereby controlling the current value to be flowed to each LED block unit, and the lighting period. Accordingly, since the light emission balance of each LED block unit varies, the color rendering properties can be made variable.

(Phosphor Layer)

Figure 14:
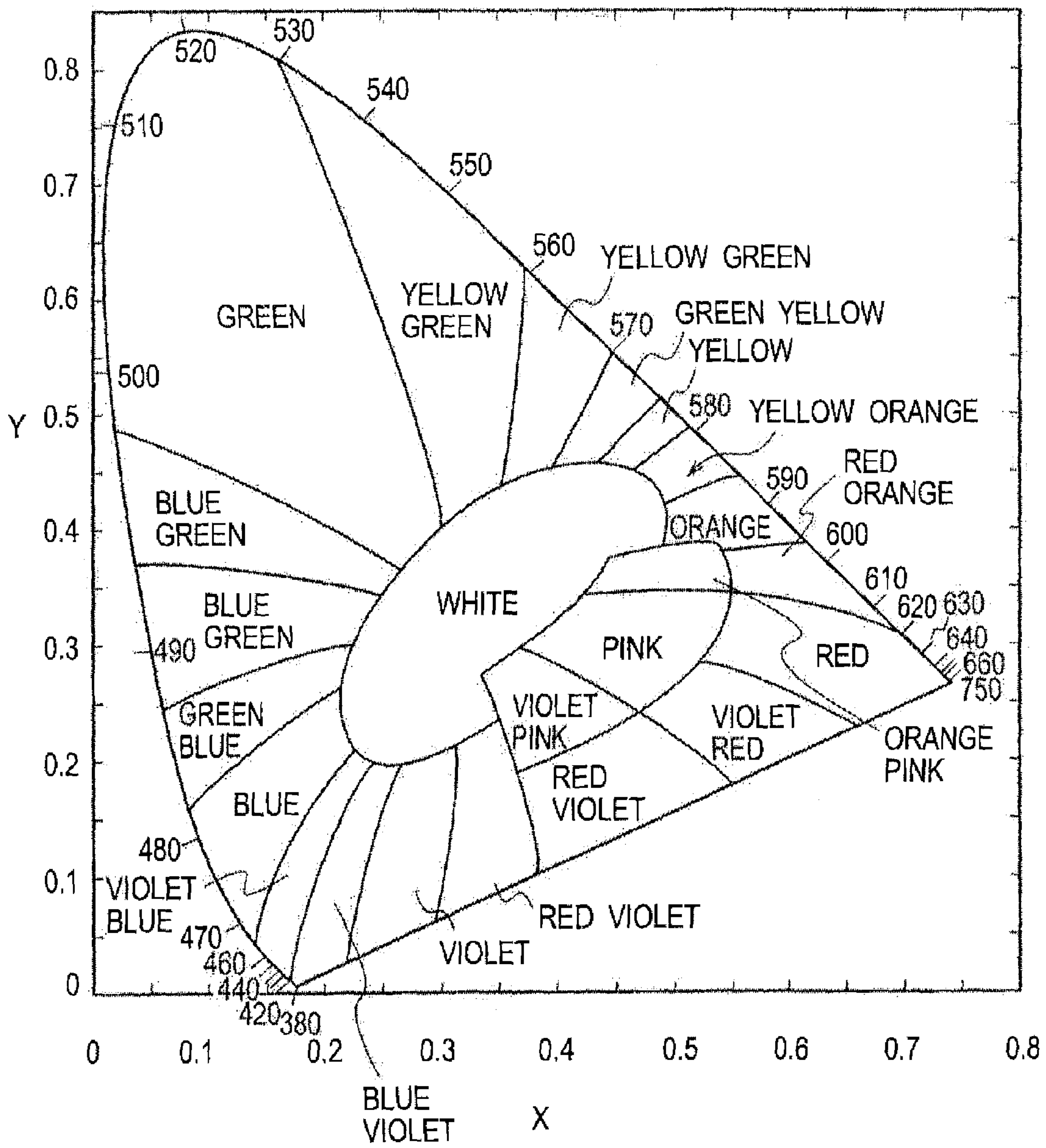
FIG. 14 is an XY color temperature diagram of an XYZ color coordinate according to the Commission Internationale de L'Eclairage (CIE) 1931.

FIG. 14 shows an XY color temperature diagram of an XYZ color coordinate according to the Commission Internationale de L'Eclairage (CIE) 1931. Such an XY color temperature diagram can be referred to at the time of selecting the phosphor layers. That is, it is possible to adopt various combinations from which color rendering properties are different as the phosphor layer. Since the construction materials for the phosphor are the same as explained in the first embodiment, the detailed explanation is omitted in this embodiment.

As explained above, in the LED flash module according to the embodiments described herein, the color rendering properties of the LED block units 320*g*, 320*h* are variable. Accordingly, if the LED flash module according to the embodiments is applied to imaging devices, e.g. digital cameras, digital camcorders, the color rendering properties can be changed according to situations, and thereby arrangements different from the conventional imaging devices can be achieved.

Moreover, according to the embodiments described herein, the color rendering properties are changed not by image processing but by the LED flash module. According to xenon lamps of which the color rendering properties are fixed, it is necessary to change the color rendering properties by image processing. However, according to the embodiments described herein, such a load of the image processing can be reduced.

Although the configuration of including the phosphor layers having the different color rendering properties has been illustrated, the embodiments described herein are not limited to such a configuration. For example, if the current value to be flowed to each LED and the lighting period are also controlled with a configuration in which individual LEDs having emission color different from one another are combined, the color rendering properties can be varied.

Fourth Embodiment

Hereinafter, a fourth embodiment will be described focusing on a different point from the first to third embodiment, with reference to FIGS. 15-19.

(Configuration of LED Flash Module)

An LED flash module according to the fourth embodiment includes: a module substrate 111; an energy device (e.g., EDLC) 18 arranged on the module substrate 111, the energy device 18 including at least two layers of layered structure in which a positive electrode and a negative electrode of an active material electrode are alternately laminated so that a positive electrode and a negative electrode of extraction electrodes 34 portions are exposed, while inserting a separator 30 through which an electrolysis solution and ions can pass between the active material electrode portions of electrodes in which the positive and negative active material electrodes and the positive and negative extraction electrodes 34 are integrated; an LED module 320 arranged on the module substrate 111, the LED module 320 in which a plurality of LED block units 320*g*, 320*h* are vertically arranged (in a specific direction), the LED block units 320*a* to 320*f* in which a plurality of LED elements emitting light using a power source supplied from the energy device 18 are arranged horizontally (in an orthogonal direction with respect to the specific direction); an EDLC charger circuit 311 disposed on the module substrate 111, the EDLC charger circuit 311 configured to charge the energy device 18; and an LED driver control circuit 313 disposed on the module substrate 111, the LED driver control circuit 313 configured to control light emission from the LED element, wherein in the case where a plural rows of LED elements 364 are arranged thereon, anode electrodes A and anode electrodes A respectively formed on the LED elements 364 of adjacent rows 364*h*, 364*l*, or cathode electrodes C and cathode electrodes C respectively formed on the LED elements 364 of the adjacent rows 364*h*, 364*l* are arranged so as to be opposed to each other, anode wiring or cathode wiring formed on the module substrate 111 is common wiring C11.

Comparative Example

Figure 15A:
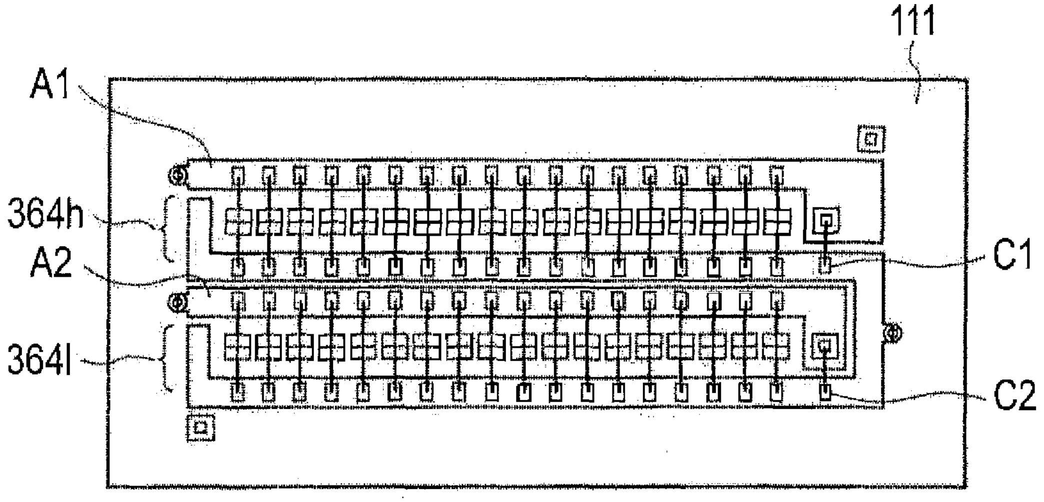
FIG. 15A is a schematic planar pattern configuration diagram of an arrangement example of an LED element according to a fourth embodiment; and is in particular a general view thereof.
Figure 15B:
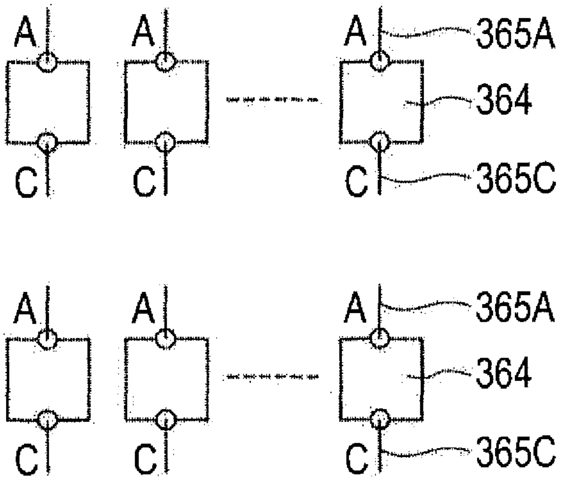
FIG. 15B is a schematic planar pattern configuration diagram of the arrangement example of the LED element according to the fourth embodiment; and is in particular a partially enlarged view thereof.

FIG. 15 is a schematic planar pattern configuration diagram showing an arrangement example of the LED elements 364 according to the fourth embodiment. FIG. 15 illustrates the case where two rows of the LED elements 364 are arranged. FIG. 15B shows a partially enlarged view of FIG. 15A. As shown in FIG. 15, in the case of arranging two rows of the LED elements 364, the anode wirings A1 and A2 and the cathode wirings C1 and C2 are respectively required on both sides of each LED element 364.

That is, in FIG. 15, the anode electrode A of the LED elements 364 composing the upper side row 364*h* is connected to the anode wiring A1 on the module substrate 111 via the bonding wires 365A, e.g. an Au wire, for example. On the other hand, the cathode electrodes C of the LED elements 364 composing the upper side row 364*h* is connected to the cathode wiring C1 on the module substrate 111 via the bonding wire 365C.

Moreover, in FIG. 15, the anode electrode A of the LED elements 364 composing the lower side row 364*i* is connected to the anode wiring A2 on the module substrate 111 via the bonding wires 365A. On the other hand, the cathode electrodes C of the LED elements 364 composing the lower side row 364*i* is connected to the cathode wiring C2 on the module substrate 111 via the bonding wire 365C.

(Example of Staggered Arrangement)

Figure 16A:
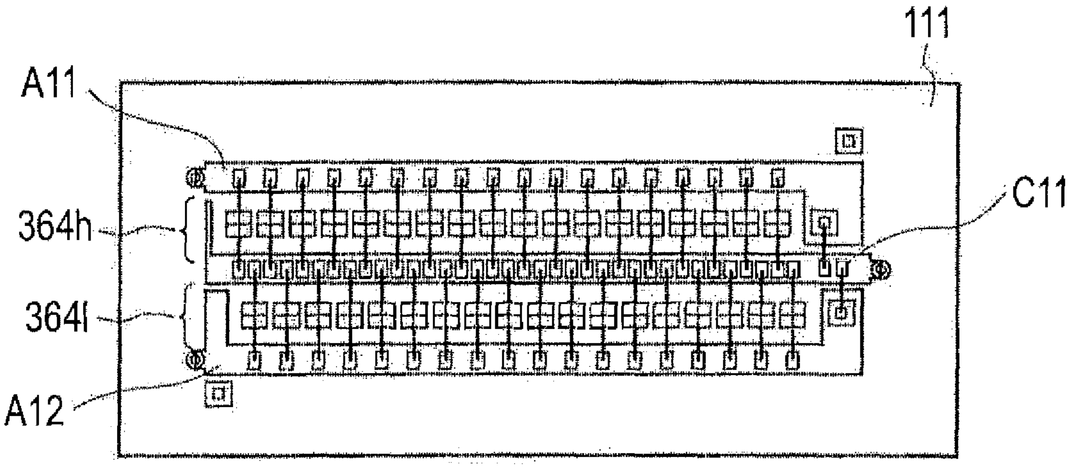
FIG. 16A is a schematic planar pattern configuration diagram of an arrangement example of the LED element according to the fourth embodiment; and is in particular a general view thereof.
Figure 16B:
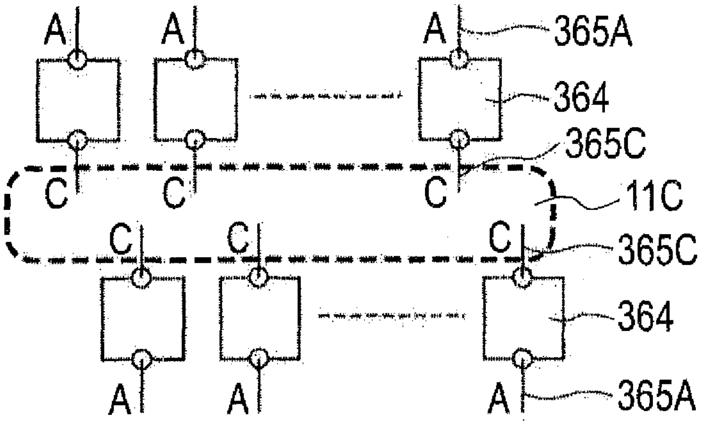
FIG. 16B is a schematic planar pattern configuration diagram of the arrangement example of the LED element according to the fourth embodiment; and is in particular a partially enlarged view thereof.

FIG. 16 is a schematic planar pattern configuration diagram showing an arrangement example of the LED elements 364 according to the fourth embodiment. In this example, the cathode electrodes C and the cathode electrodes C respectively formed on the LED elements 364 of the adjacent rows 364*h*, 364*l* are arranged so as to be opposed to each other. Accordingly, the cathode wirings can be used in common, and thereby all of the cathode electrode C can be connected to the common wiring C11 formed on the module substrate 111. Accordingly, the wiring number formed on the module substrate 111 is reduced compared with the comparative example. Consequently, the width between the row 364*h* and the row 364*l* can be narrowed, and thereby the area of the module substrate 111 can be reduced.

Moreover, in this example, the LED elements 364 are arranged in staggered arrangement for each row 364*h*, 364*l*. Accordingly, since the bonding wires 365A, 365C can be mounted in vertical direction with respect to the common electrode C11, the length of each bonding wire 365A, 365C can be made the shortest.

(Example of Arrangement in the Same Row)

Figure 17A:
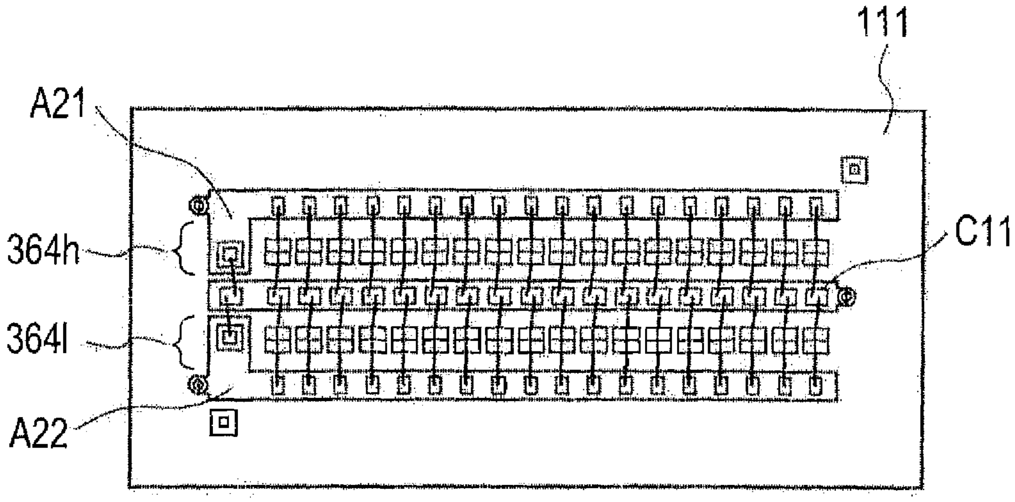
FIG. 17A is a schematic planar pattern configuration diagram of an arrangement example of the LED element according to the fourth embodiment; and is in particular a general view thereof.
Figure 17B:
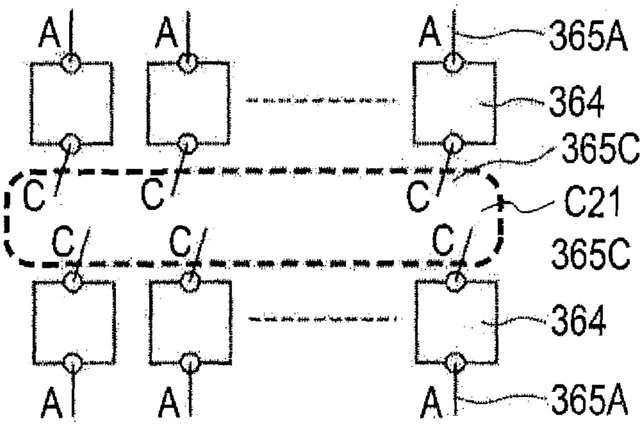
FIG. 17B is a schematic planar pattern configuration diagram of the arrangement example of the LED element according to the fourth embodiment; and is in particular a partially enlarged view thereof.

FIG. 17 is a schematic planar pattern configuration diagram showing an arrangement example of the LED elements 364 according to the fourth embodiment. Also in this example, the cathode electrodes C and the cathode electrodes C respectively formed on the adjacent rows 364*h*, 364*l* in the LED elements 364 are arranged so as to be opposed to each other, in the same manner as the case of FIG. 16. Accordingly, a point that the area for the module substrate 111 can be reduced is the same as the case of FIG. 16.

In this example, each row of the LED elements 364 is arranged in the same row. The term "arranged in the same row" means that each longitudinal position of the rows 364*h*, 364*l* is the same position in FIG. 17. Accordingly, the size of the horizontal width (in the direction X) of the module substrate 111 can be made smaller, compared with a case of FIG. 16.

Moreover, in the case where the LED elements 364 are arranged in the same row in this way, the bonding wires 365C are mounted in a specific oblique direction with respect to the common electrode C21. Accordingly, contact with the bonding wires 365C opposed to each other is avoidable.

(Example of Three-Rows Arrangement)

Figure 18A:
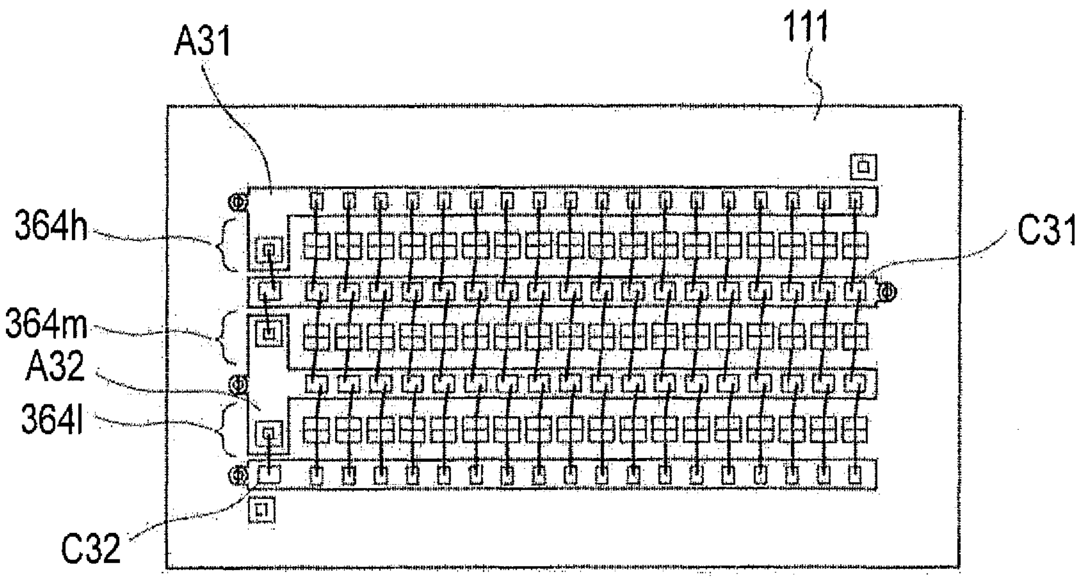
FIG. 18A is a schematic planar pattern configuration diagram of an arrangement example of the LED element according to the fourth embodiment; and is in particular a general view thereof.
Figure 18B:
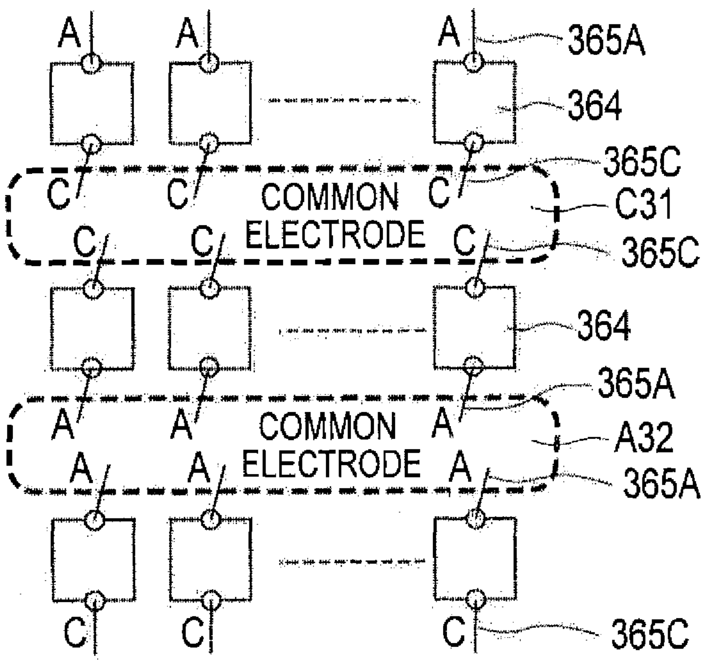
FIG. 18B is a schematic planar pattern configuration diagram of the arrangement example of the LED element according to the fourth embodiment; and is in particular a partially enlarged view thereof.

FIG. 18 is a schematic planar pattern configuration diagram showing an arrangement example of the LED elements 364 according to the fourth embodiment. FIG. 18 illustrates the case where three rows of the LED element 364 are arranged.

As shown in FIG. 18, the cathode electrodes C and the cathode electrodes C respectively formed on the LED elements 364 of the adjacent rows 364*h*, 364*m* are arranged so as to be opposed to each other. Moreover, the anode electrodes A and the anode electrodes A respectively formed on the LED elements 364 of the adjacent rows 364*m*, 364*l* are arranged so as to be opposed to each other. Accordingly, all of the cathode electrodes C are connectable to the common wiring C31 formed on the module substrate 111. Furthermore, all of the anode electrodes A are also connectable to the common electrode A32 on the module substrate 111. Accordingly, the area of the module substrate 111 is further reduced since the number of the wirings for the amount of two lines on the module substrate 111 is reduced compared with the comparative example.

Needless to say, similarly, in the case of arranging four or more rows of the LED elements 364, as one row of the module substrates 111 is added, the number of the wirings can be reduced for the amount of one line. That is, even if the row number increases, it is possible to repeat such a layout similarly. Consequently, such high-density implementation is possible as the row number increases, and thereby it is effective to the miniaturization of products.

(Cross-Sectional Structure)

Figure 19A:
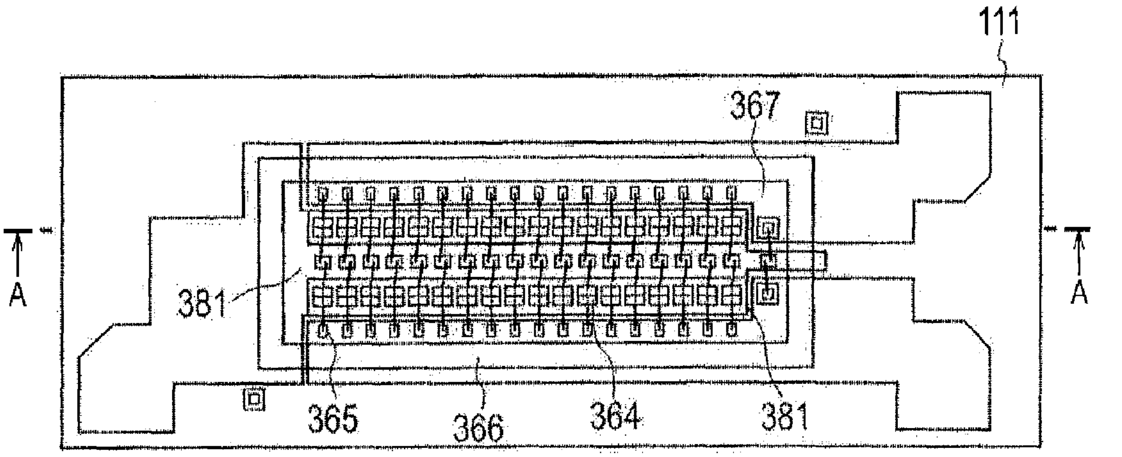
FIG. 19A shows a cross-sectional structure example of a module substrate according to the fourth embodiment, and is in particular a schematic planar pattern configuration diagram thereof.
Figure 19B:
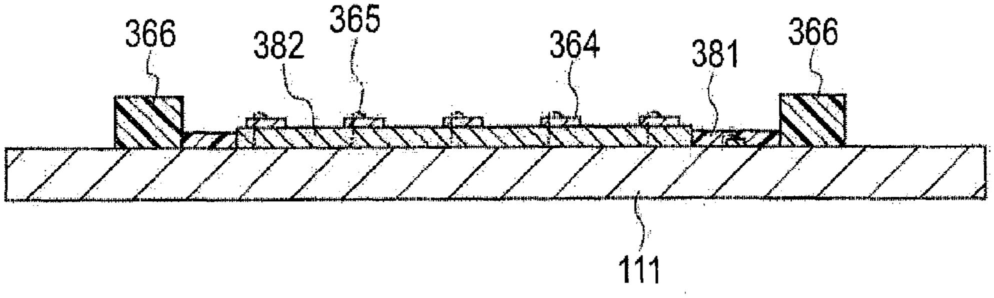
FIG. 19B shows a cross-sectional structure example of the module substrate according to the fourth embodiment; and is in particular a cross-sectional diagram taken in the line A-A of FIG. 19A in the state where a white resin is coated thereon.
Figure 19C:
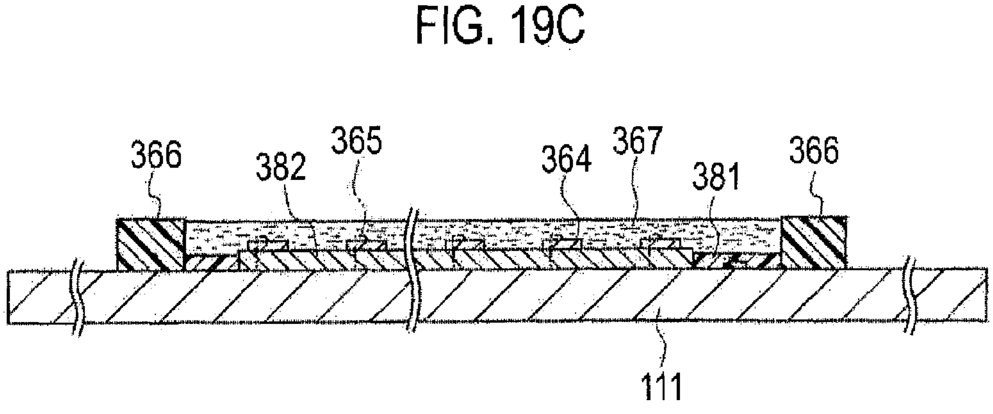
FIG. 19C shows a cross-sectional structure example of the module substrate according to the fourth embodiment; and is in particular a cross-sectional diagram taken in the line A-A of FIG. 19A in the state where a phosphor layer is coated thereon.

FIG. 19 shows a cross-sectional structure example of the module substrate 111 according to the fourth embodiment. FIG. 19A is a schematic planar pattern configuration diagram of the module substrate 111, FIG. 19B is a cross-sectional diagram taken in the line A-A of FIG. 19A, in the state where the white resin 381 is coated thereon, and FIG. 19C is a cross-sectional diagram taken in the line A-A, in the state where the phosphor layer 367 is further coated thereon.

In the present embodiments, the COB structure is adopted as already explained. That is, LED bare chips (LED elements 364) are divided to be mounted on the module substrate 111 into several LED block units in an array form, and are electrically connected to the module substrate 111 with the bonding wires 365. A dummy chip 382 for rising of Si chips etc. is mounted on the under part of the LED elements 364. The white resin 381 is a resin for improving the reflection efficiency of the LED element 364. In such a state, a silicone-based white resin is coated for each LED block unit in order to form the bank 366, and then the phosphor layer 367 is coated on the inside of the bank 366. Although the same resin is coated on the individual LED block unit, at least two or more types of different phosphor layers 367 are coated on the respective LED block units.

Although FIG. 19 illustrates the configuration of arranging two rows of the LED elements 364 on the inside of one bank 366 in in this case, it is also possible to form an additional bank 366 between the two rows of the LED elements 364. In this case, needless to say, a different phosphor layer 367 may be coated on each row (each LED block unit) divided with the additional bank 366.

As explained above, in the LED flash module according to the embodiments described herein, in the case where a plural rows of LED element 364 are arranged thereon, the anode electrodes A and the anode electrodes A respectively formed on the LED elements 364 of adjacent rows 364*h*, 364*l*, or cathode electrodes C and cathode electrodes C respectively formed on the LED elements 364 of the adjacent rows 364*h*, 364*l* are arranged so as to be opposed to each other, anode wiring or cathode wiring formed on the module substrate 111 is common wiring C11. Accordingly, since the wiring number formed on the module substrate 111 is reduced, the area of the module substrate 111 can be reduced, and thereby it becomes possible to achieve the miniaturization of products. Since plenty of the LED elements 364 can be mounted with the identical size, it also becomes possible to realize high-intensity products.

Although the case where the plural rows of LED elements 364 are arranged is illustrated in this case, the embodiments described herein are not limited to such a case. That is, such an arrangement structure can be applied not only to the LED elements 364 but also to various elements required for plural rows of arrangements.

Fifth Embodiment

Hereinafter, a fifth embodiment will be described focusing on a different point from the first to fourth embodiment, with reference to FIGS. 20-22.

Figure 20:
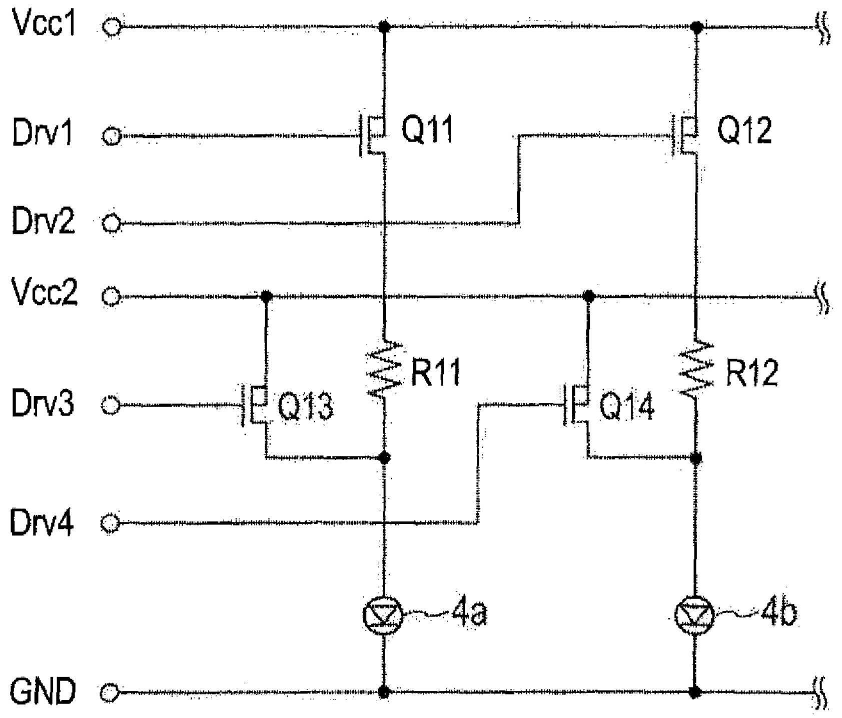
FIG. 20 is a schematic circuit block configuration diagram of a main part of an LED flash module according to a fifth embodiment.

FIG. 20 is a schematic circuit block configuration diagram showing a main part of an LED flash module according to the fifth embodiment. The present embodiment focuses attention on a configuration between LED elements 4*a*, 4*b* and an LED flash driver 310. Although the LED flash driver 310, the energy device 18, the battery 330, and the external resistor R4, etc. are not illustrated, but the configuration thereof are the same as that of FIG. 2 similar. Of course, the LED flash driver 310 includes the EDLC charger circuit 311, the charger control circuit 312, the LED driver control circuit 313, and the LED constant current control circuit 314.

As shown in FIG. 20, the LED flash module according to the embodiments described herein provides switches Q11-Q14 in each LED element 4*a*, 4*b*, and the LED driver control circuit 313 makes desired LED element 4*a* or 4*b* selectively light by individually controlling the switches Q11-Q14. Although FIG. 20 shows the LED elements 4*a*, 4*b* as one LED element, a plurality of the LED elements may be connected in parallel to each other.

(Operation of LED Flash Module)

First, an operation at the time of the LED flash mode will now be explained. If the Flash signal is input therein in the charge completion state of the energy device 18, the switches Q11, Q12 are turned ON, the electric current flows into the LED elements 4*a*, 4*b*, and then the LED flash will light. The electric current at the time of the LED flash is controlled by the external resistors R11, R12.

Next, an operation at the time of the LED torch mode will now be explained. The LED constant current control circuit 314 performs constant current drive of the LED elements 4*a*, 4*b* using the power source supplied from the battery 330. The electric current used for the LED torch is controlled by the external resistor R4. The switches Q11, Q12 are already turned OFF. In the case of making the LED element 4*a* light, the switch Q13 is turned ON. In the case of making the LED element 4*b* light, the switch Q13 is turned ON. Accordingly, since the LED elements 4*a*, 4*b* are individually driven, it becomes possible to realize various lighting patterns.

(Announcing Mode)

Figure 21A:
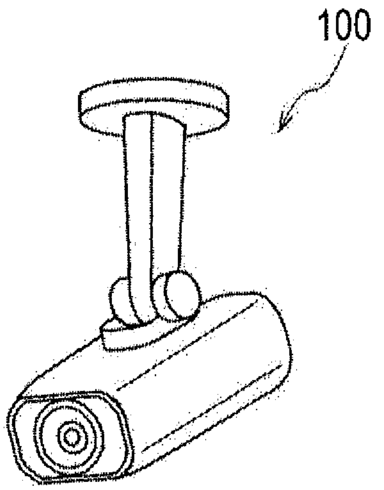
FIG. 21A is a diagram showing an application example of the LED flash module according to the fifth embodiment; and is in particular a schematic bird's-eye view structure diagram thereof.
Figure 21B:
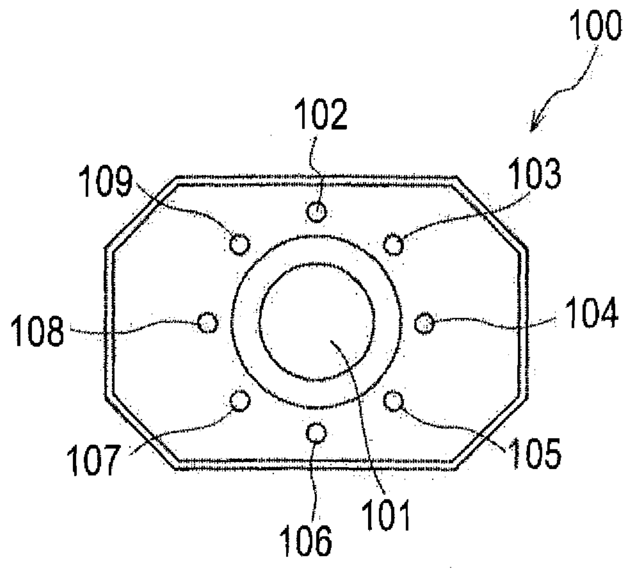
FIG. 21B is a diagram showing an application example of the LED flash module according to the fifth embodiment; and is in particular a schematic front view diagram of a lens portion.
Figure 22:
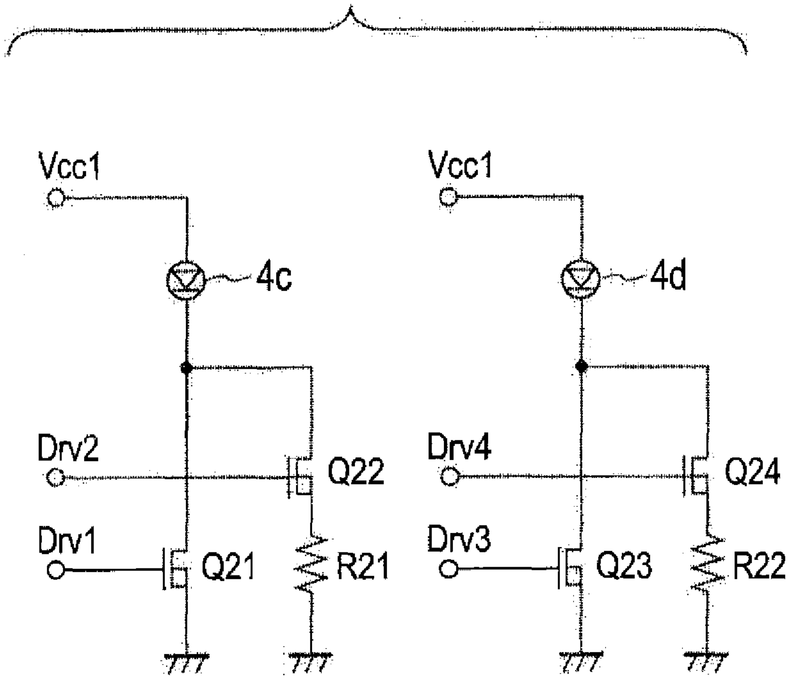
FIG. 22 is a schematic circuit block configuration diagram showing a main part of another LED flash module according to the fifth embodiment.

FIG. 21 is a diagram showing an application example of the LED flash module according to the fifth embodiment. In the present embodiment, the case of an application example to a monitoring camera 100 is illustrated. The monitoring camera 100 is installed on an indoor ceiling etc., as shown in FIG. 21A. Then, if a sensor (not illustrated) reacts, a plurality of LED lighting units 102-109 disposed around of a lens 101 are individually controlled to light in individual timing, as shown in FIG. 215. Although the lighting pattern in particular is not limited, it may be controlled to light up for a predetermined time, in the order from the LED lighting unit 102 to LED lighting unit 109, for example. Since a lighting pattern rotating around the lens 101 can be realized in this way, it can easily notice existence of the monitoring camera 100 to a suspicious person, etc. (announcing mode).

Such an announcing mode can be utilized not only for the monitoring camera 100 but also for various scenes. For example, when using a camera for photographing using self-timer, it may be similarly controlled to light up around the lens for a predetermined time until a flash of light is emitted. Accordingly, the timing to emit the flash of light can be notified to a user, and thereby the usability thereof is improved.

As explained above, in the LED flash module according to the embodiments described herein, the switches Q11-Q14 are disposed in each LED element 4*a*, 4*b*. Consequently, a desired LED element 4*a* or 4*b* can be made to light selectively by individually controlling the switches Q11-Q14. Accordingly, it is possible to realize various lighting patterns.

The circuit configuration according to the embodiments described herein is not limited to that of FIG. 20. For example, as shown in FIG. 22, the position of the LED elements 4*c*, 4*d* and the position of the switches Q21-Q24 can also be formed upside down made on the drawing. In this case, the switches Q21, Q23 may be turned ON at the time of the LED flash mode, and the switches Q22, Q24 may be turned ON at the time of the LED torch mode. According to such a configuration, a desired LED element 4*c* or 4*d* can be made to light selectively by individually controlling the switches Q22, Q24.

Although the announcing mode is illustrated and explained herein, needless to say, the type of the mode is not limited to the announcing mode. That is, since various lighting patterns are realizable, it is possible to provide various modes according to the various lighting patterns.

(Laminated Type Energy Device)

There will now be explained a laminated type energy device 18 applicable to the LED flash module according to the first to fifth embodiments in detail hereinafter. There are methods of mounting such a laminated type energy device 18 on the module Substrate 111, the methods are not limited in particular. For example, it is also possible to mount the laminated type energy device 18 on the substrate surface of the module substrate 111, as explained hereinafter. Hereinafter, the mounting method of the laminated type energy device 18 will now be explained. Consequently, although a physical relationship between the LED element and the laminated type energy device 18 may not be explicit, it is configured so that the laminated type energy device 18 does not shield the light irradiated from the LED element.

Figure 23:
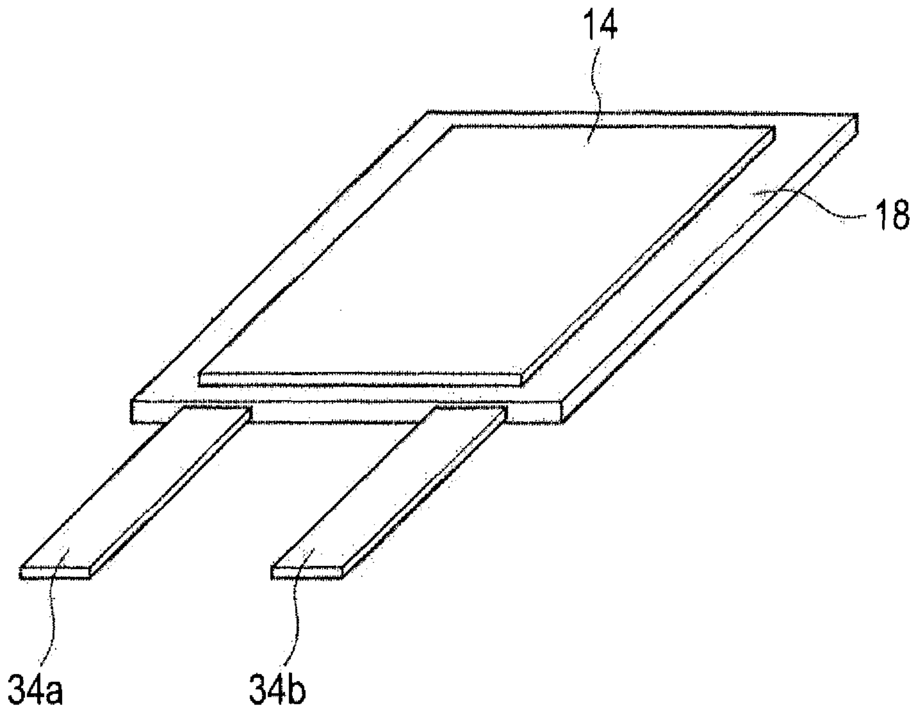
FIG. 23 is a schematic bird's-eye view structure diagram showing a laminated type energy device applicable to the LED flash modules according to the first to fifth embodiments.
Figure 24:
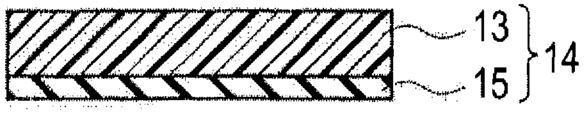
FIG. 24 is a schematic cross-sectional structure diagram of a seal part of the laminated type energy device applicable to the LED flash modules according to the first to fifth embodiments.

FIG. 23 is a schematic bird's-eye view structure diagram of the laminated type energy device 18 applicable to the LED flash module according to the first to fifth embodiments. As shown in FIG. 23, a seal part 14 for covering a main part of the laminated type energy device 18 is adhered on one surface of the laminate sheet. The seal part 14 is composed of an adhesive material 13 coated on the one surface of the laminate sheet, and a strippable paper 15 formed to cover the surface of the adhesive material 13, as shown in FIG. 24. As the adhesive material 13, it is preferred to use insulating materials superior in thermal conductivity. The strippable paper 15 is subjected to strippable process on the surface of the strippable paper. Although the method of adhering the seal part 14 of the laminate sheet is not limited in particular, there is easy a method of stripping the strippable paper of one side of double-stick tape, and adhering the stripped one side of double-stick tape to the laminate sheet. Although the case where the seal part 14 is adhered to one surface of the laminate sheet is illustrated in the present embodiment, the seal part 14 may be adhered to both surfaces of the laminate sheet.

—Mounting Method—

Next, a method of mounting the laminated type energy device 18 will now be explained.

Figure 25A:
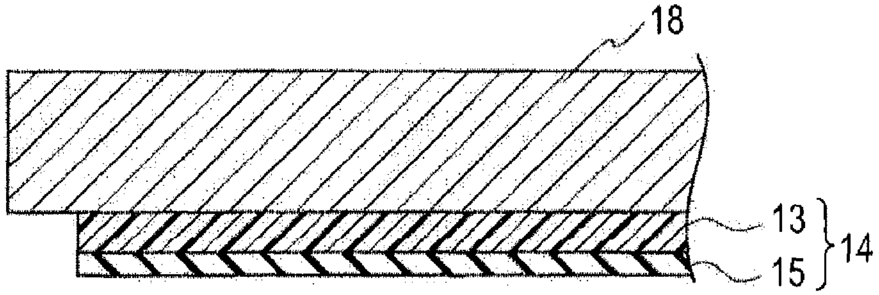
FIG. 25A is a diagram for explaining a mounting method of the laminated type energy device applicable to the LED flash modules according to the first to fifth embodiments; and is in particular a schematic cross-sectional structure diagram showing a state before a strippable paper being stripped.
Figure 25B:
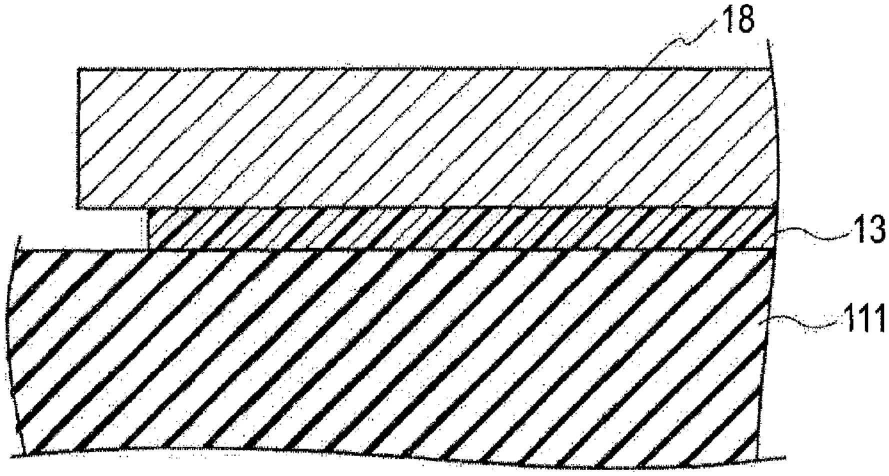
FIG. 25B is a diagram for explaining a mounting method of the laminated type energy device applicable to the LED flash modules according to the first to fifth embodiments; and is in particular a schematic cross-sectional structure diagram showing a state after the strippable paper being stripped.
Figure 26:
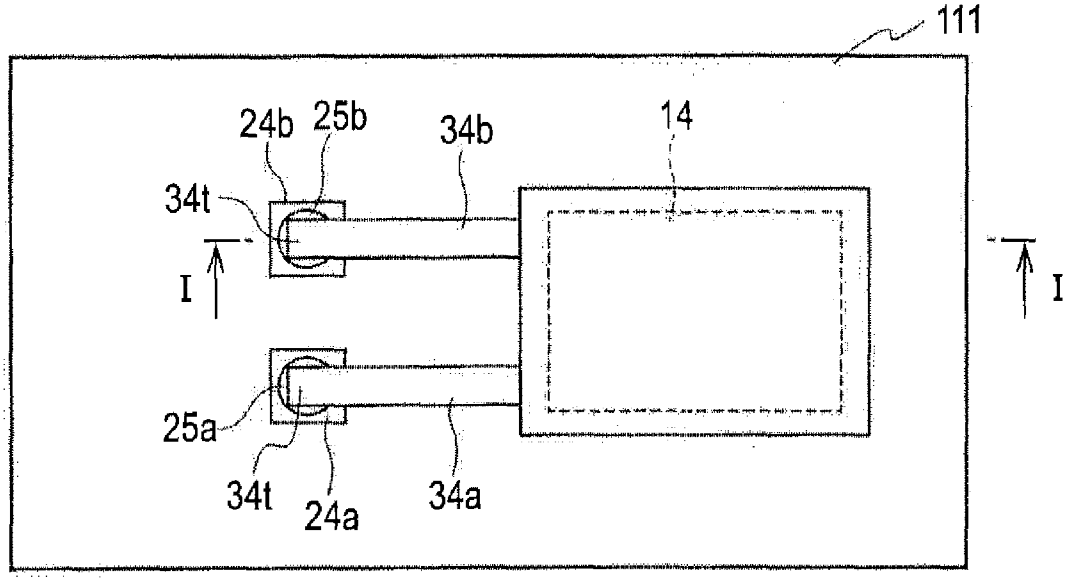
FIG. 26 is a schematic planar pattern configuration diagram of a module substrate on which a laminated type energy device applicable to the LED flash modules according to the first to fifth embodiments is mounted.
Figure 27:
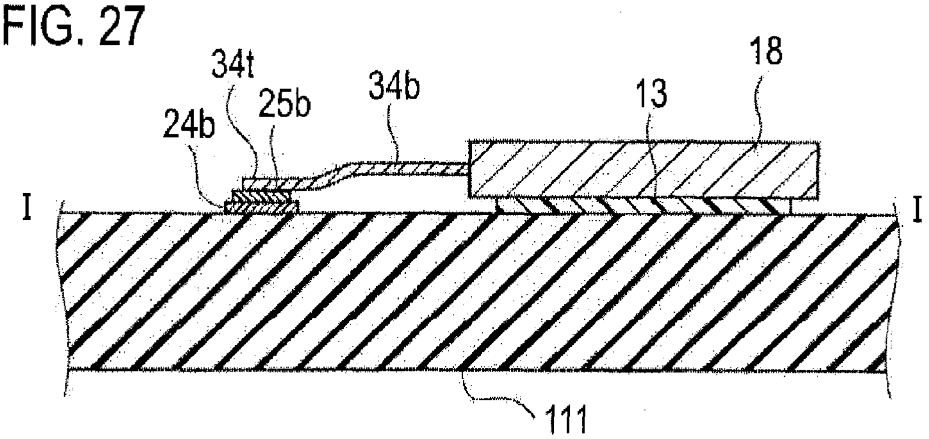
FIG. 27 is a schematic cross-sectional structure diagram of the module substrate on which the laminated type energy device applicable to the LED flash modules according to the first to fifth embodiments is mounted.
Figure 28:
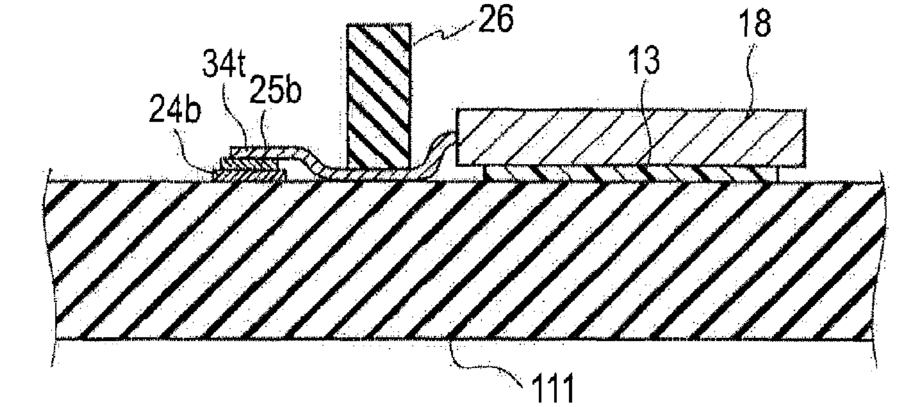
FIG. 28 is a schematic cross-sectional structure diagram of the module substrate on which the laminated type energy device applicable to the LED flash modules according to the first to fifth embodiments is mounted.

Firstly, as shown in FIG. 25A, the strippable paper 15 covering the laminate sheet is stripped. In the state where an adhesive material 13 is exposed on a portion from which the strippable paper 15 is stripped, the laminated type energy device 18 is adhered and fixed to a predetermined mounting position of the module substrate 111, as shown in FIG. 25B. FIG. 26 shows a schematic planar pattern configuration diagram of the module substrate 111 in this state, and FIG. 27 shows a schematic cross-sectional structure thereof taken in the line I-I of FIG. 26. As shown in FIG. 25, the tips 34*t* of extraction electrodes 34*a*, 34*b* are respectively disposed on near weld holes 25*a*, 25*b* of soldered parts 24*a*, 24*b*. Although the main part of the laminated type energy device 18 is fixed to the module substrate 111 with the adhesive material 13 at this time point, soft and long extraction electrodes 34*a*, 34*b* are not fixed to the module substrate 111, and therefore are in an unstable state. Therefore, as shown in FIG. 28, the extraction electrodes 34*a*, 34*b* are pressed down to the module substrate 111 side using heat-resistant rubber 26, etc., and the solder welding (electrically connection) is performed therebetween with the weld holes 25*a*, 25*b* of the soldered parts 24*a*, 24*b*. Accordingly, in the state of the extraction electrodes 34*a*, 34*b* are fixed to the main part of the laminated type energy device 18, the solder welding of the extraction electrodes 34*a*, 34*b* can be executed.

The extraction electrodes 34*a*, 34*b* are preferred to be subjected to bending work in advance in a height direction of the module substrate 111 (hereinafter referred to as "substrate height direction"). The substrate height direction corresponds to the up-and-down direction in FIGS. 27 and 28. Accordingly, since the tips 34*t* of the extraction electrodes 34*a*, 34*b* are further closed to the weld holes 25*a*, 25*b* of the soldered parts 24*a*, 24*b*, it becomes possible to perform more easily solder welding. Although the degree of the bending work may be appropriately changed according to the thickness, the mounting position, etc. of the laminated type energy device 18, it is appropriate to set as approximately several mm to approximately several tens of mm.

Figure 29:
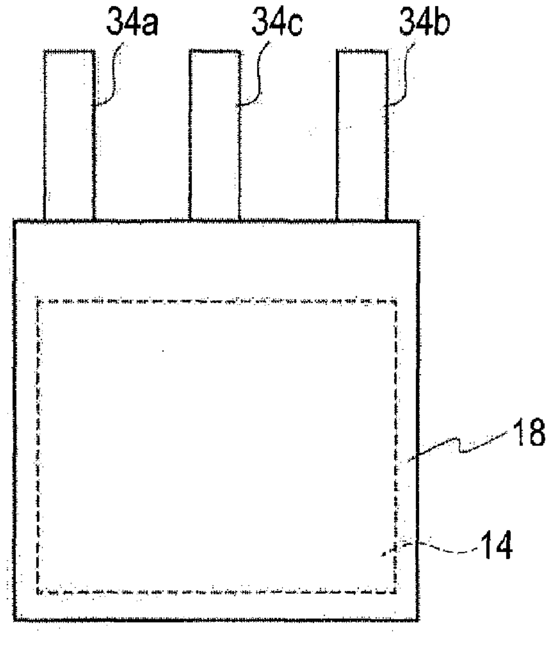
FIG. 29 is a schematic planar pattern configuration diagram of a laminated type energy device having three terminals, which is the laminated type energy device applicable to the LED flash module according to the first to fifth embodiments.
Figure 30A:
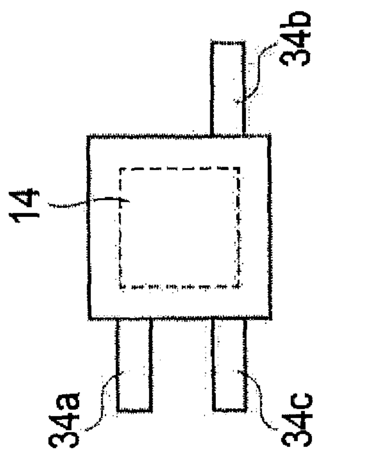
FIG. 30A is a schematic planar pattern configuration diagram illustrating a various example of the laminated type energy device having three terminals, which is the laminated type energy device applicable to the LED flash module according to the first to fifth embodiments.
Figure 30B:
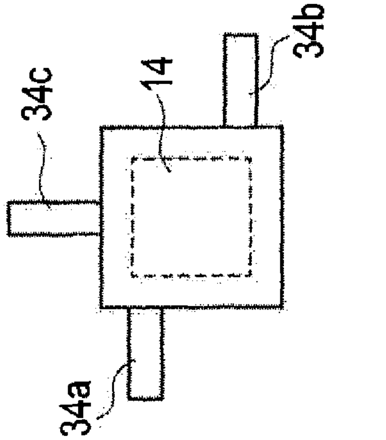
FIG. 30B is a schematic planar pattern configuration diagram illustrating a various example of the laminated type energy device having three terminals, in a similar manner as in FIG. 30A.
Figure 30C:
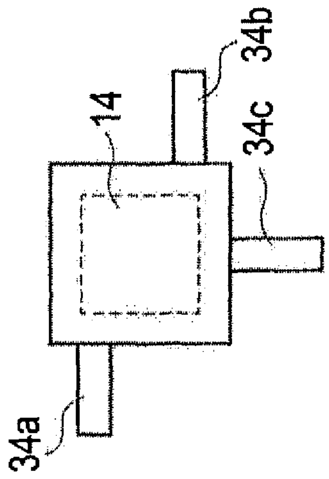
FIG. 30C is a schematic planar pattern configuration diagram illustrating a various example of the laminated type energy device having three terminals, in a similar manner as in FIG. 30A.
Figure 30D:
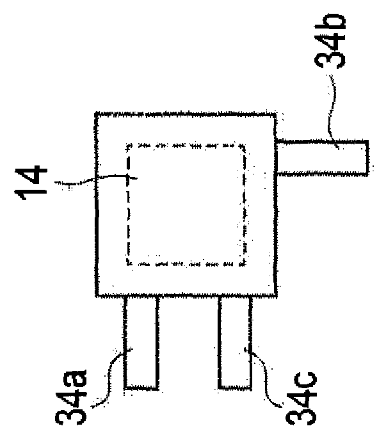
FIG. 30D is a schematic planar pattern configuration diagram illustrating a various example of the laminated type energy device having three terminals, in a similar manner as in FIG. 30A.
Figure 30E:
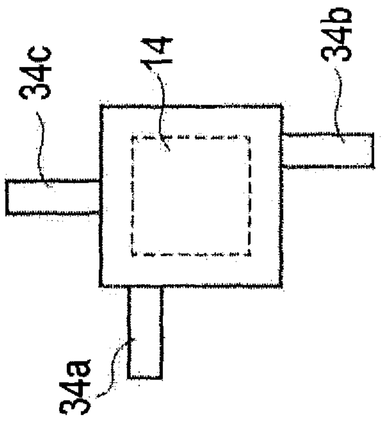
FIG. 30E is a schematic planar pattern configuration diagram illustrating a various example of the laminated type energy device having three terminals, in a similar manner as in FIG. 30A.
Figure 30F:
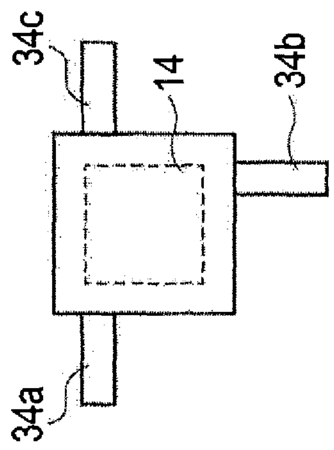
FIG. 30F is a schematic planar pattern configuration diagram illustrating a various example of the laminated type energy device having three terminals, in a similar manner as in FIG. 30A.
Figure 31A:
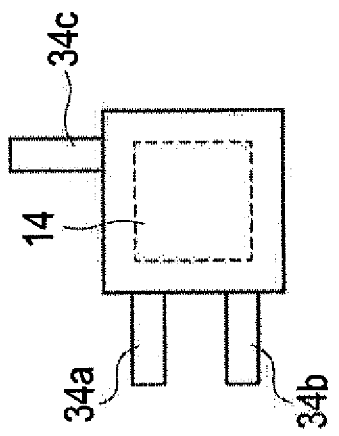
FIG. 31A is a schematic planar pattern configuration diagram illustrating a variation of the laminated type energy device having three terminals, which is the laminated type energy device applicable to the LED flash module according to the first to fifth embodiments.
Figure 31B:
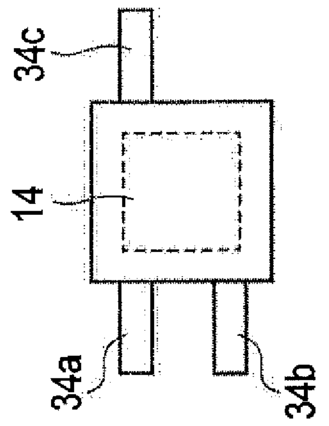
FIG. 31B is a schematic planar pattern configuration diagram illustrating a various example of the laminated type energy device having three terminals, in a similar manner as in FIG. 31A.
Figure 31C:
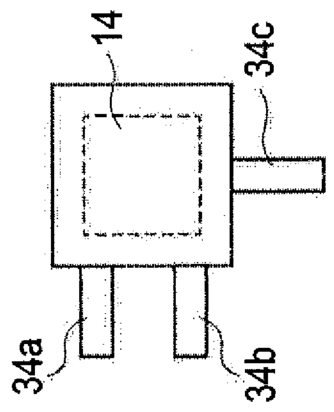
FIG. 31C is a schematic planar pattern configuration diagram illustrating a various example of the laminated type energy device having three terminals, in a similar manner as in FIG. 31A.
Figure 31D:
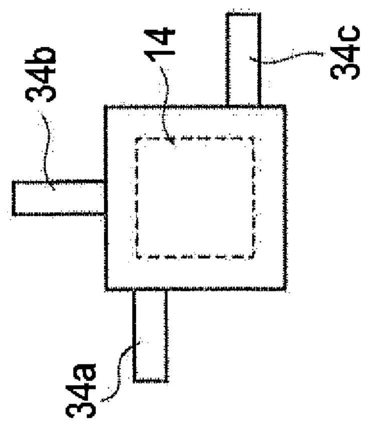
FIG. 31D is a schematic planar pattern configuration diagram illustrating a various example of the laminated type energy device having three terminals, in a similar manner as in FIG. 31A.
Figure 31E:
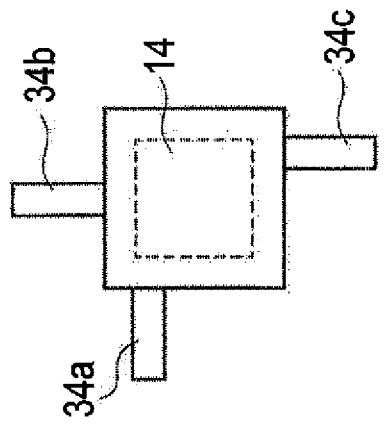
FIG. 31E is a schematic planar pattern configuration diagram illustrating a various example of the laminated type energy device having three terminals, in a similar manner as in FIG. 31A.
Figure 31F:
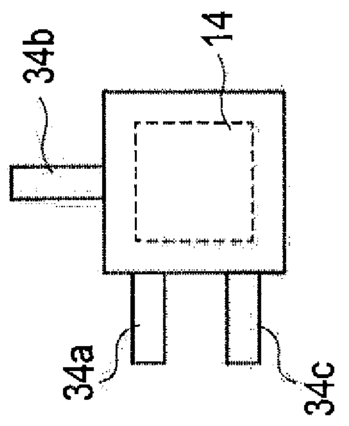
FIG. 31F is a schematic planar pattern configuration diagram illustrating a various example of the laminated type energy device having three terminals, in a similar manner as in FIG. 31A.

Although the configuration including two extraction electrodes 34*a*, 34*b* is illustrated in the present embodiment, as shown in FIG. 29, there can be provided three extraction electrodes 34*a*, 34*b*, 34*c*. The laminated type energy device 18 having three terminals is composed by connecting two laminated type energy devices 18 having two terminals in series. FIG. 30A to FIGS. 30F and 31A to FIG. 31F illustrate various arrangement examples of three extraction electrodes 34*a*, 34*b*, 34*c* included in the laminated type energy device 18 having three terminals. As shown in the aforementioned drawings, three extraction electrodes 34*a*, 34*b*, 34*c* can be extracted from an arbitrary side surfaces of the laminated type energy device 18. Also in such a laminated type energy device 18 having three terminals, the point of forming the seal part 14 on the laminate sheet is the same as that of the case of laminated type energy device 18 having two terminals.

Figure 32:
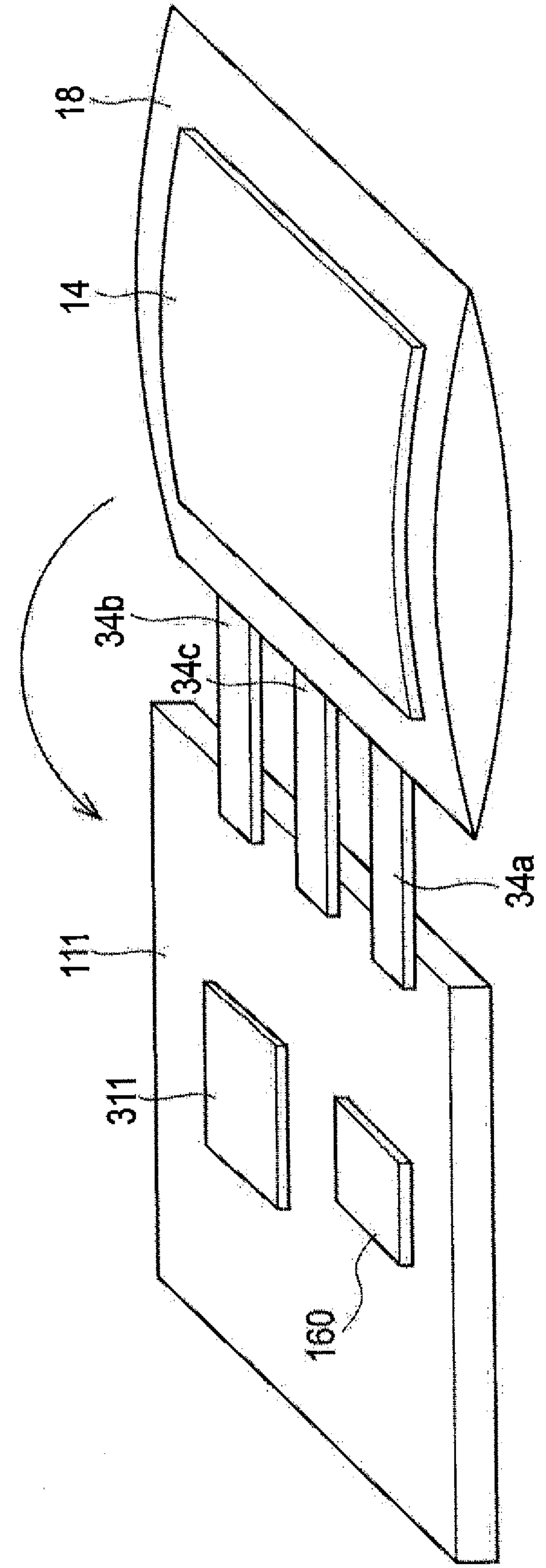
FIG. 32 is a schematic bird's-eye view structure diagram for explaining another mounting method of the laminated type energy device applicable to the LED flash module according to the first to fifth embodiments.
Figure 33:
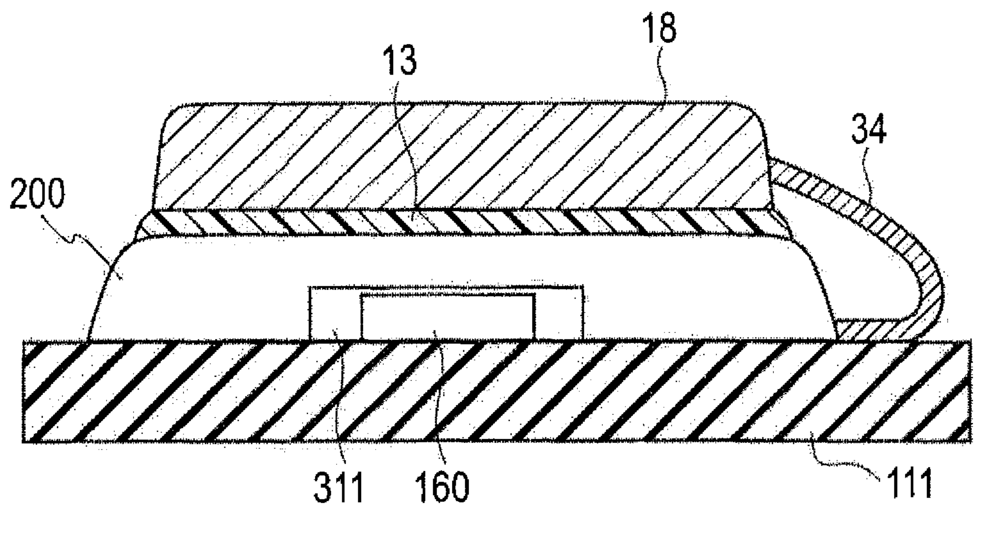
FIG. 33 is a schematic cross-sectional structure diagram for explaining another mounting method of the laminated type energy device applicable to the LED flash module according to the first to fifth embodiments.

FIGS. 32 and 33 are diagrams for explaining other mounting methods of the laminated type energy device 18. Firstly, as shown in FIG. 32, components, e.g. an EDLC charger circuit 311, a DC/DC converter 160, etc., are mounted on the module substrate 111, and then are electrically connected thereto with the wire bonding. The extraction electrodes 34*a*, 34*b*, 34*c* of the laminated type energy device 18 are pressed down on a prescribed position of the module substrate 111, and are subjected to the solder welding. Next, as shown in FIG. 33, the components of the EDLC charger circuit 311 and the DC/DC converter 160, etc. are covered with a hard coat 200. Next, in the state of the strippable paper 15 on the laminated type energy device 18 is stripped, the extraction electrodes 34*a*, 34*b*, 34*c* are bent, and the surface of the laminated type energy device 18 to which the adhesive material 13 is exposed is bonded on the outer surface of the hard coat 200. Furthermore, since the laminated type energy device 18 is fixed on the hard coat 200, it becomes possible to effectively utilize the limited substrate space.

Figure 34:
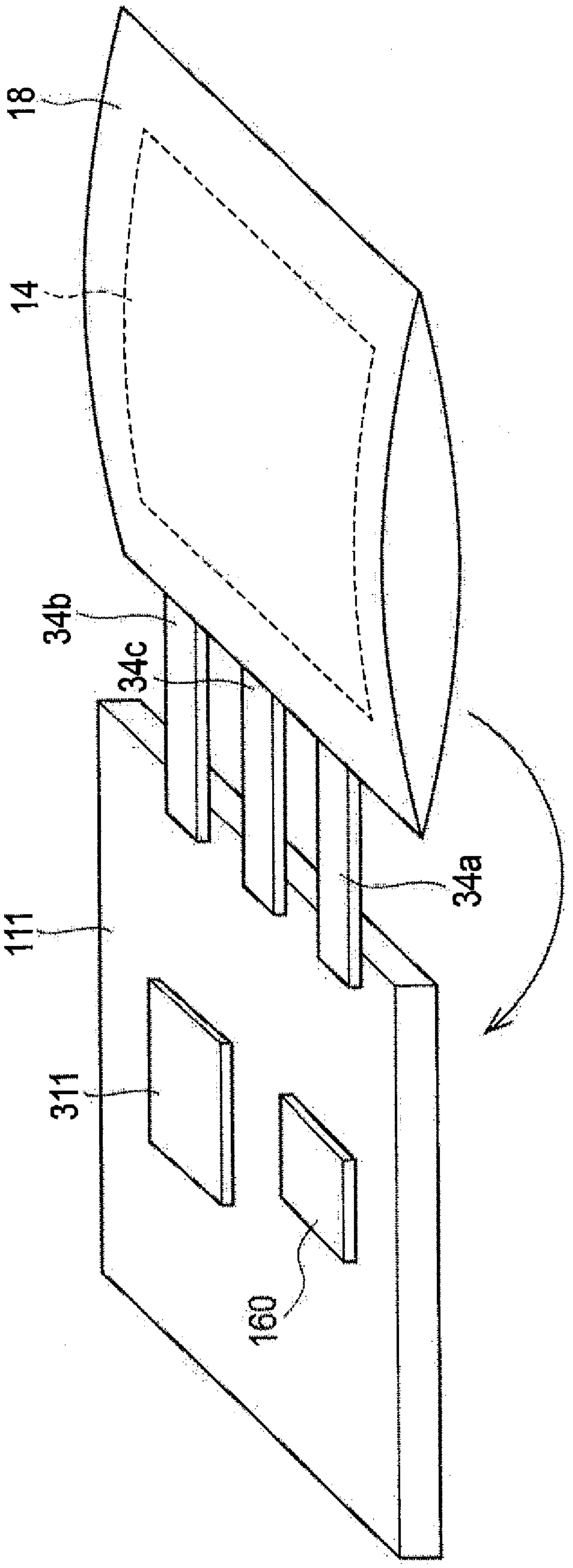
FIG. 34 is a schematic bird's-eye view structure diagram for explaining still another mounting method of the laminated type energy device applicable to the LED flash module according to the first to fifth embodiments.
Figure 35:
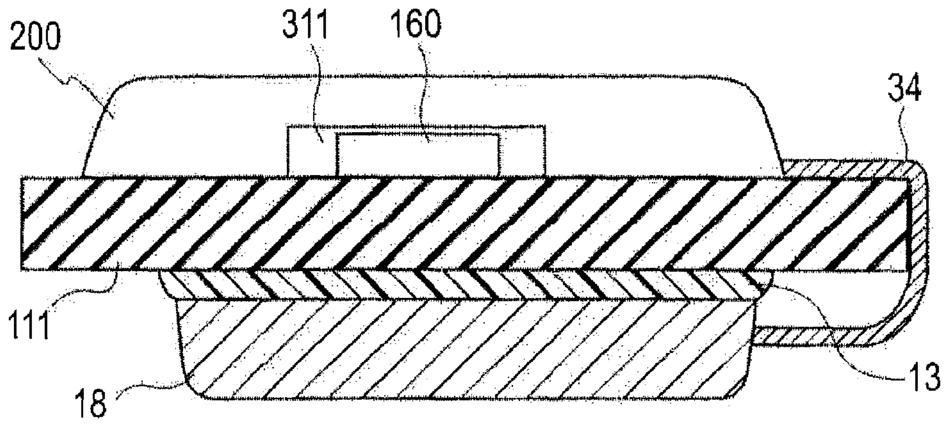
FIG. 35 is a schematic cross-sectional structure diagram for explaining still another mounting method of the laminated type energy device applicable to the LED flash module according to the first to fifth embodiments.

FIGS. 34 and 35 are diagrams for explaining other mounting methods of the laminated type energy device 18. It is the same as that of FIGS. 32 and 33 except a point that the extraction electrodes 34*a*, 34*b*, 34*c* are further extended so that the laminated type energy device 18 is fixed to the back side surface of the module substrate 111. That is, as shown in FIG. 34, the components of the EDLC charger circuit 311 and the DC/DC converter 160, etc., are mounted on the module substrate 111, and then are electrically connected thereto with the wire bonding. The extraction electrodes 34*a*, 34*b*, 34*c* of the laminated type energy device 18 are pressed down on a prescribed position of the module substrate 111, and are subjected to the solder welding. Next, as shown in FIG. 35, the components of the EDLC charger circuit 311 and the DC/DC converter 160, etc. are covered with the hard coat 200. Next, in the state of the strippable paper 15 on the laminated type energy device 18 is stripped, the extraction electrodes 34*a*, 34*b*, 34*c* are bent, and the surface of the laminated type energy device 18 to which the adhesive material 13 is exposed is bonded on the back surface of the module substrate 111. The back side surface of the module substrate 111 is a surface opposite to the surface on which the components of the EDLC charger circuit 311 and the DC/DC converter 160, etc. are mounted. Accordingly, there can be provided the module substrate 111 insulated with the hard coat 200. Furthermore, since the laminated type energy device 18 is fixed on the back surface of the module substrate 111, it becomes possible to effectively utilize the limited substrate space.

In the present embodiment, the laminated type energy device 18 is bonded on the outer surface of the hard coat 200, or on the back side surface of the module substrate 111, after performing the solder welding of the extraction electrodes 34*a*, 34*b*, 34*c*, but the mounting procedure is not limited to such a procedure That is, it is also possible to perform the solder welding of the extraction electrodes 34*a*, 34*b*, 34*c*, after bonding the laminated type energy device 18 on the outer surface of the hard coat 200, or on the back side surface of the module substrate 111.

As mentioned above, according to the laminated type energy device 18 applicable to the LED flash module according to the first to fifth embodiments, since the laminated type energy device 18 is fixed to the mounting position with the adhesive material 13, the laminated type energy device 18 can be stability mounted on the module substrate 111. Accordingly, since the reliability of the electric connection is improved, it is effective, in particular in the case where the implementation of the laminated type energy device 18 it automated to mass-produces the module substrate 111. Moreover, since the laminated type energy device 18 is fixed on the outer surface of the hard coat 200, or on the back surface of the module substrate 111, it becomes possible to effectively utilize the limited substrate space.

Figure 36A:
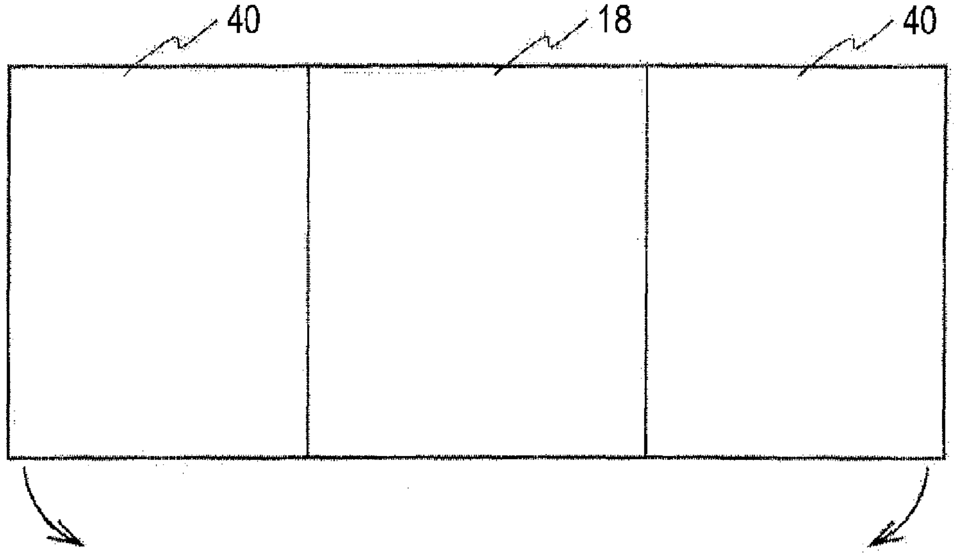
FIG. 36A is a diagram for explaining the mounting method of the laminated type energy device applicable to the LED flash module according to the first to fifth embodiments; and is in particular a schematic planar pattern configuration diagram thereof.
Figure 36B:
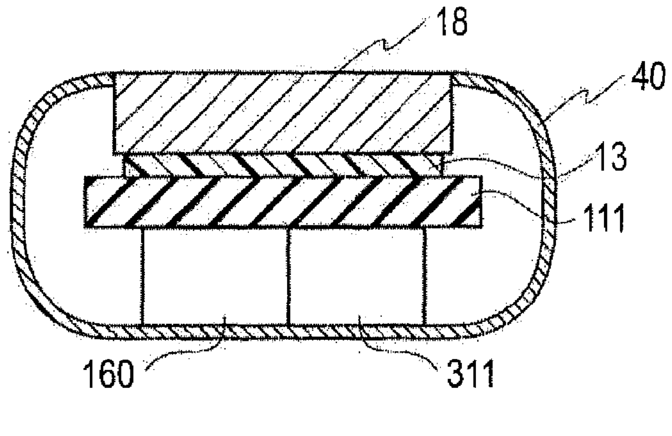
FIG. 36B is a diagram for explaining the mounting method of the laminated type energy device applicable to the LED flash module according to the first to fifth embodiments; and is in particular a schematic cross-sectional structure diagram thereof in the case of being mounted on the module substrate.

FIG. 36 is a diagram for explaining the mounting method of the laminated type energy device 18 applicable to the LED flash module according to the first to fifth embodiments; FIG. 36A is a schematic planar pattern configuration diagram of the module substrate 111, and FIG. 36B is in particular a schematic cross-sectional structure diagram thereof in the case of being mounted on the module substrate. As shown in FIG. 36, the laminate sheet 40 is subjected to a pressing treatment so as to become an outside shape for wrapping the module substrate 111. That is, usually, after compressively sealing the laminate sheet along with a predetermined laminating line, a line slightly outside from the laminating line is subjected to the pressing treatment to remove unnecessary portion of the laminate sheet. On the other hand, in the embodiments described herein, as shown in FIG. 36A, the pressing treatment is performed in the state of the laminate sheet 40 is largely left at both sides of the laminated type energy device 18. Accordingly, as shown in FIG. 36B, when the module substrate 111 is mounted on the laminated type energy device 18, the module substrate 111 can be wrapped with the laminate sheet 40 provided in both sides of the laminated type energy device 18. Various aspects of wrapping the module substrate 111 will be explained in detail later. The laminated type energy device 18 has only to be fixed to the module substrate 111 at least. Although the construction materials of the laminate sheet 40 should just be an insulating film etc., it is preferred to use materials having high adhesiveness with respect to the module substrate 111.

Figure 37:
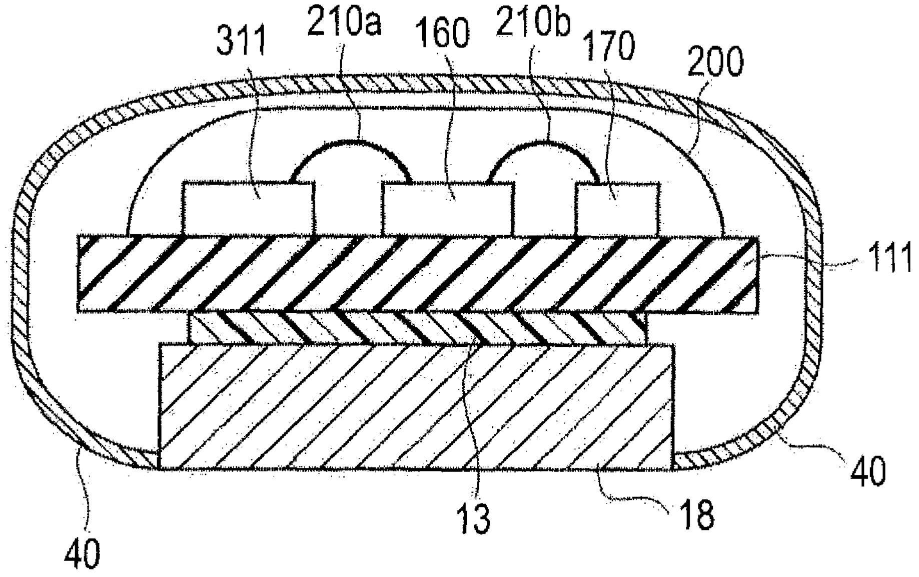
FIG. 37 is a schematic cross-sectional structure diagram for explaining still another mounting method of the laminated type energy device applicable to the LED flash module according to the first to fifth embodiments.
Figure 38:
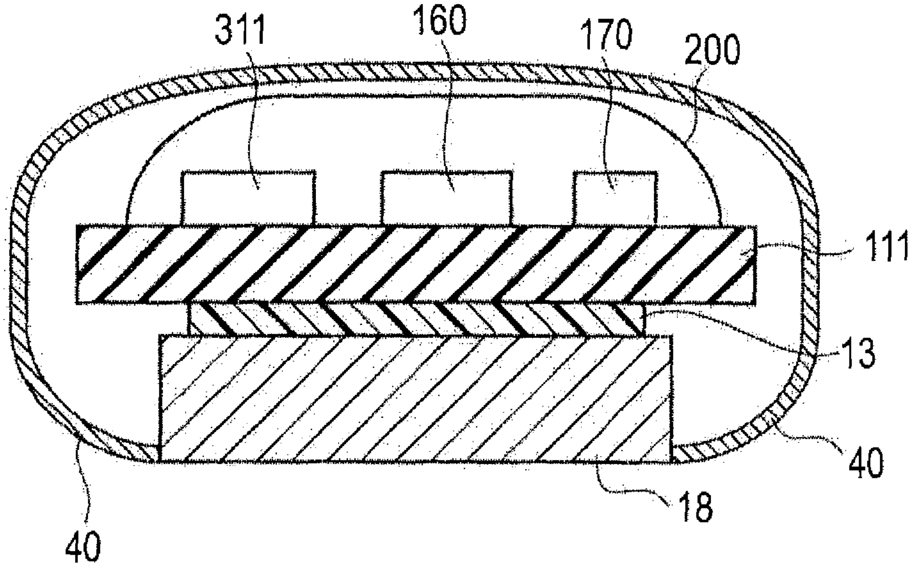
FIG. 38 is a schematic cross-sectional structure diagram for explaining still another mounting method of the laminated type energy device applicable to the LED flash module according to the first to fifth embodiments.
Figure 39A:
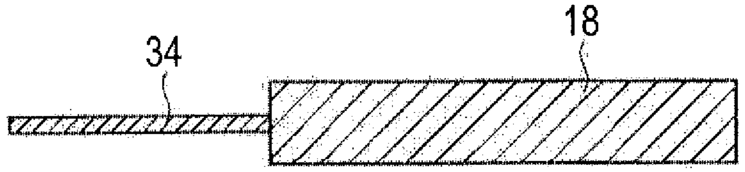
FIG. 39A is a diagram for explaining a various example of bending of an extraction electrode in the laminated type energy device applicable to the LED flash module according to the first to fifth embodiments; and is in particular a schematic cross-sectional structure diagram thereof in the case where the extraction electrode is not bended.
Figure 39B:
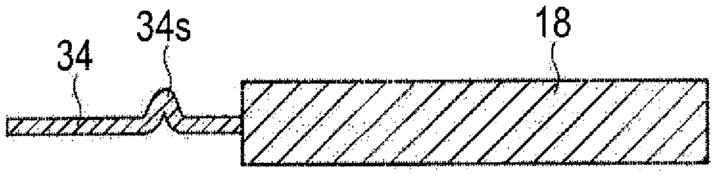
FIG. 39B is a diagram for explaining a various example of bending of the extraction electrode in the laminated type energy device applicable to the LED flash module according to the first to fifth embodiments; and is in particular a schematic cross-sectional structure diagram thereof in the case where the extraction electrode is bended.
Figure 39C:
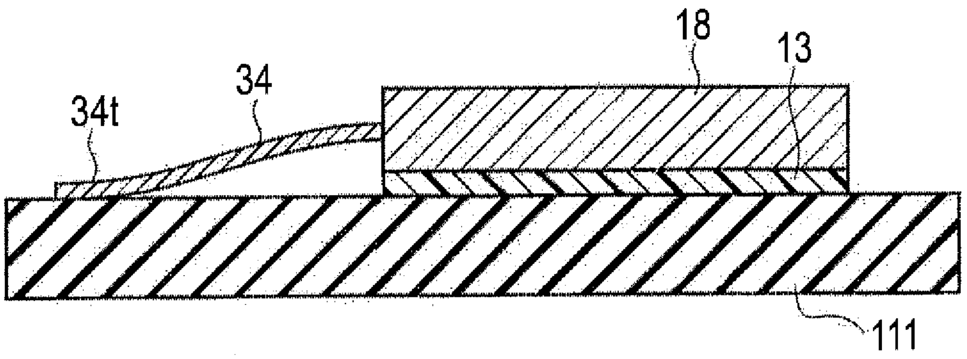
FIG. 39C is a diagram for explaining a various example of bending of the extraction electrode in the laminated type energy device applicable to the LED flash module according to the first to fifth embodiments; and is in particular a schematic cross-sectional structure diagram showing an aspect on the module Substrate in the case where the extraction electrode is not bended.
Figure 39D:
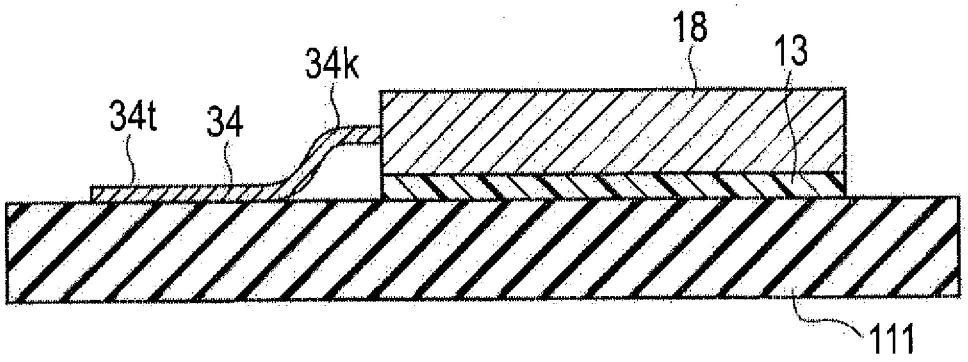
FIG. 39D is a diagram for explaining a various example of bending of the extraction electrode in the laminated type energy device applicable to the LED flash module according to the first to fifth embodiments; and is in particular a schematic cross-sectional structure diagram showing an aspect on the module substrate in the case where the extraction electrode is bended.

FIGS. 37 and 38 are diagrams for explaining other mounting methods of the laminated type energy device 1B. Reference numerals 210*a*, 210*b* in FIG. 37 denote wires for connecting various kinds of components. As shown in FIGS. 37 and 38, in the state of the components of the EDLC charger circuit 311 and the DC/DC converter 160, etc. are covered with the hard coat 200, the laminated type energy device 18 may be fixed to the back side of the module substrate 111 so as to wrap the module substrate 111 with the laminate sheet 40 provided in both sides of the laminated type energy device 18.

As mentioned above, according to the laminated type energy device 18 applicable to the LED flash module according to the first to fifth embodiments, the module substrate 111 can be wrapped with the laminate sheet 40, and thereby it is possible to stably mount the laminated type energy device 18 in the module substrate 111. Moreover, if the components such as the EDLC charger circuit 311, the DC/DC converter 160, are also wrapped with the laminate sheet 40, the components can also be stably mounted, and there is also a merit of protecting from unnecessary electric connection.

Although the case where the laminated type energy device 18 is fixed to the module substrate 111 with the adhesive material 13 is illustrated, it is not in particular limited whether or not the adhesive material 13 is used, in the embodiments described herein. That is, a certain effect in that the laminated type energy device 18 is fixed to the module substrate 111 can also be expected by wrapping the module substrate 111 with the laminate sheet 40.

FIG. 39 is a diagram for explaining a various example of bending of the extraction electrode 34 in the laminated type energy device 18 applicable to the LED flash module according to the first to fifth embodiments. FIG. 39B illustrates the case where an approximately center portion of the extraction electrode 34 is subjected to reverse V-shaped bending 34*s*. Since such reverse V-shaped bending 34*s* is performed, the stress can be absorbed even when the extraction electrode 34 receives a certain loading weight. FIG. 39C illustrates the case where the extraction electrode 34 is made to be smoothly inclined toward the left-hand side in the drawing, without performing the bending. FIG. 39D illustrates the case where the extraction electrode 34 is subjected to bending 34*k* so as to be rapidly inclined toward the left-hand side in the drawing. Although it is possible to control the height position of the tip 34*t* of the extraction electrode 34 with the both cases in FIGS. 39C and 39D, the case of FIG. 39D can bring the tip 34*t* of the extraction electrode 34 close to the laminated type energy device 18 side rather than the case of FIG. 39C.

Figure 40A:
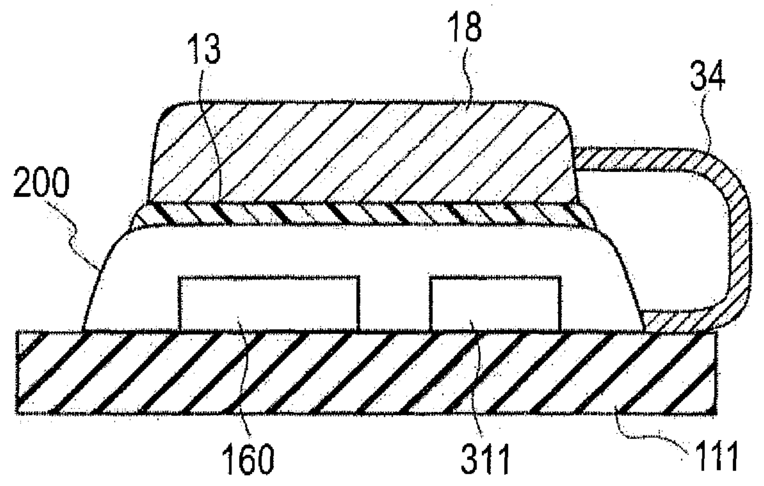
FIG. 40A is a schematic cross-sectional structure diagram for explaining still another mounting method of the laminated type energy device applicable to the LED flash module according to the first to fifth embodiments; and is in particular a structure example of an aspect that the extraction electrode is folded down, and then a surface of EDLC on which an adhesive material is exposed is bonded on an outer surface of a hard coat.
Figure 40B:
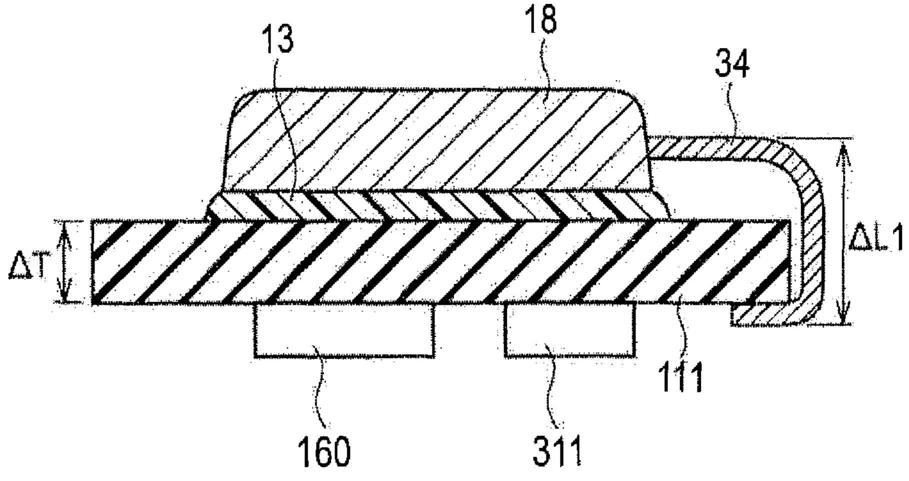
FIG. 40B is a schematic cross-sectional structure diagram for explaining still another mounting method of the laminated type energy device applicable to the LED flash module according to the first to fifth embodiments; and is in particular a structure example showing an aspect that the extraction electrode is folded down, and the surface of EDLC on which an adhesive material is exposed is bonded on the surface opposite to the surface on which components, e.g. an EDLC charger circuit and a DC/DC converter, are mounted.

FIG. 40 is a diagram for explaining the mounting method of the laminated type energy device 18 applicable to the LED flash module according to the first to fifth embodiments. In FIG. 40A, the extraction electrode 34 is folded down, and then the surface of the laminated type energy device 18 to which the adhesive material 13 is exposed is bonded on the outer surface of the hard coat 200. In FIG. 40B, the extraction electrode 34 is folded down, and then the surface of the laminated type energy device 18 to which the adhesive material 13 is exposed is bonded on the surface opposite to the surface on which the components, such as the EDLC charger circuit 311, the DC/DC converter 160, etc. are mounted. In other words, the extraction electrode 34 covers only the substrate surface opposite to the substrate surface on which the laminated type energy device 18 is mounted. Accordingly, the length ΔL1 of the extraction electrode 34 in the substrate height direction is set to be longer than the height ΔT of the module substrate 111, in this case.

Figure 41A:
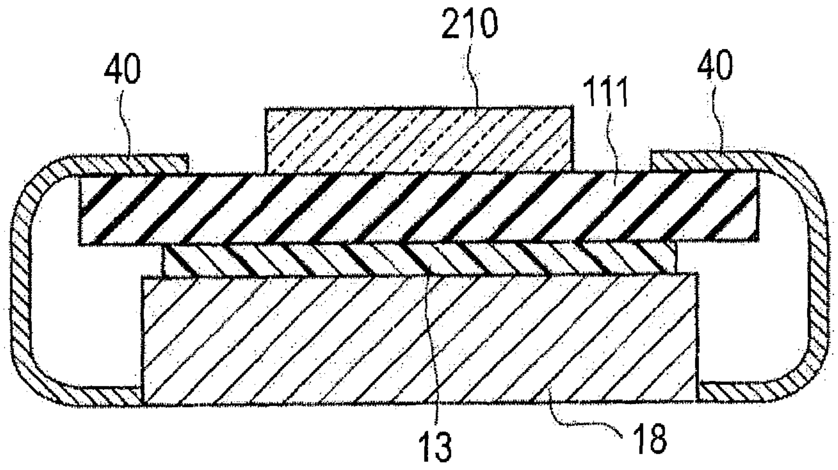
FIG. 41A is a schematic cross-sectional structure diagram for explaining still another mounting method of the laminated type energy device applicable to the LED flash module according to the first to fifth embodiments; and is in particular a structure example of an aspect that the EDLC is fixed on the back side of the module substrate, and only a substrate surface at the side opposite to the substrate surface on which the EDLC is mounted is covered with a laminate sheet formed on both sides of the EDLC.
Figure 41B:
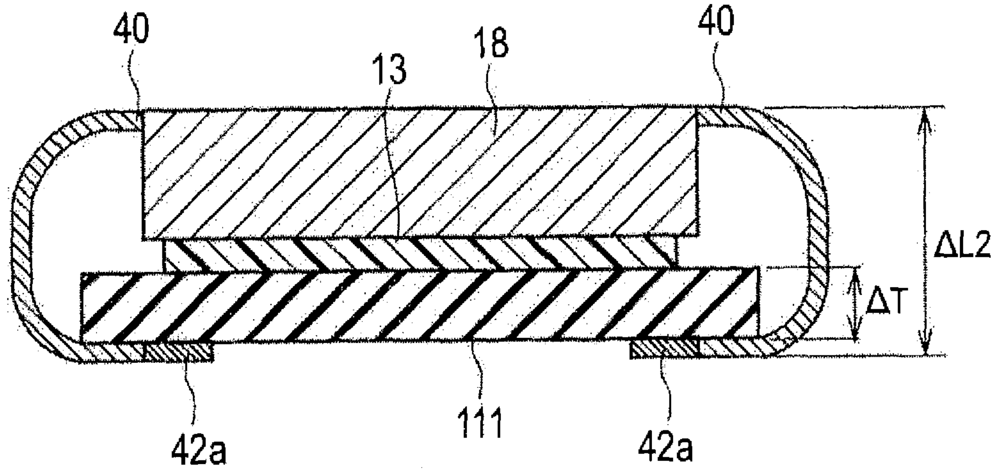
FIG. 41B is a schematic cross-sectional structure diagram for explaining still another mounting method of the laminated type energy device applicable to the LED flash module according to the first to fifth embodiments; and is in particular a structure example showing an aspect that an edge part of the laminate sheet is contacted with specific components in order to covering the specific components.

FIG. 41 is a diagram for explaining the mounting method of the laminated type energy device 18 applicable to the LED flash module according to the first to fifth embodiments. In FIG. 41A, the laminated type energy device 18 is fixed to the backside of the module substrate 111, and then only the substrate surface opposite to the substrate surface on which the laminated type energy device 18 is mounted is covered with the laminate sheet 40 provided on both sides of the laminated type energy device 18. Such a configuration is effective in particular in the case where the components denoted with reference numeral 210 are LED. That is, the module substrate 111 can be wrapped with the laminate sheet 40, without shielding the light emitted from the LED 210. Although the laminate sheet 40 may cover only the substrate surface, the edge parts of the laminate sheet 40 may be contacted with a specific component 42*a* or may cover the specific component 42*a*, as shown in FIG. 41B. Also in this case, the length ΔL2 of the laminate sheet 40 in the substrate height direction is set to be longer than the height ΔT of the module substrate 111.

Figure 42:
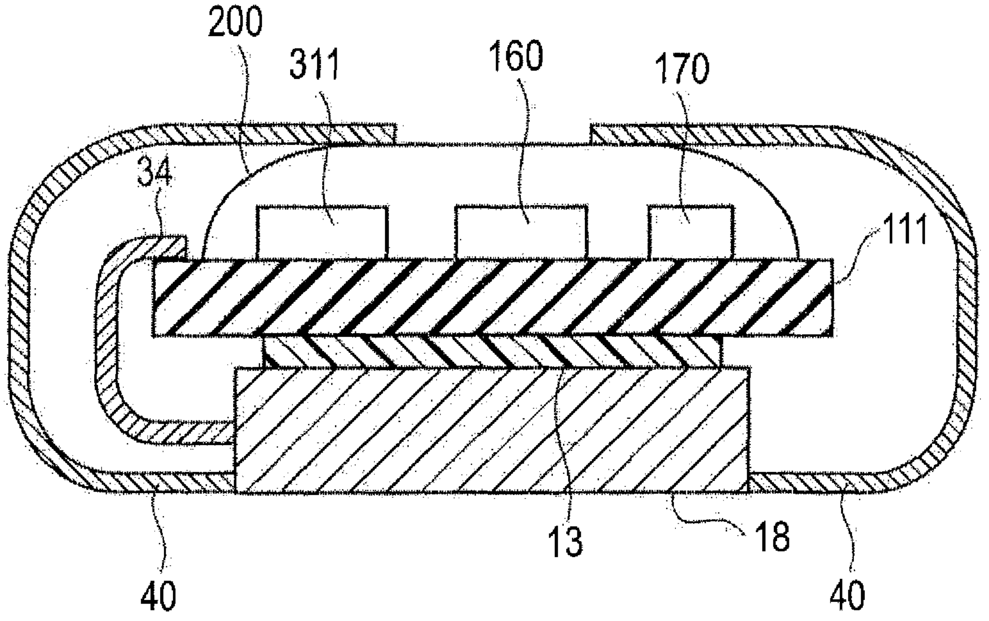
FIG. 42 is a schematic cross-sectional structure diagram for explaining still another mounting method of the laminated type energy device applicable to the LED flash module according to the first to fifth embodiments.

FIG. 42 is a diagram for explaining the mounting method of the laminated type energy device 18 applicable to the LED flash module according to the first to fifth embodiments. In the present embodiment, the laminated type energy device 18 is fixed to the module substrate 111 with both of the extraction electrode 34*a*, 34*b* and the laminate sheet 40. The edge parts of the laminate sheet 40 covers the outer surface of the hard coat 200. Thus, it is possible to appropriately combine various implementation aspects.

In the above-mentioned explanation, although the EDLC is illustrated as the laminated type energy device 18, a lithium ion capacitor, a lithium ion battery, etc. may be adopted as a laminated type energy device 18. Hereinafter, a fundamental structure of each internal electrode will now be explained.

(EDLC Internal Electrode)

Figure 43:
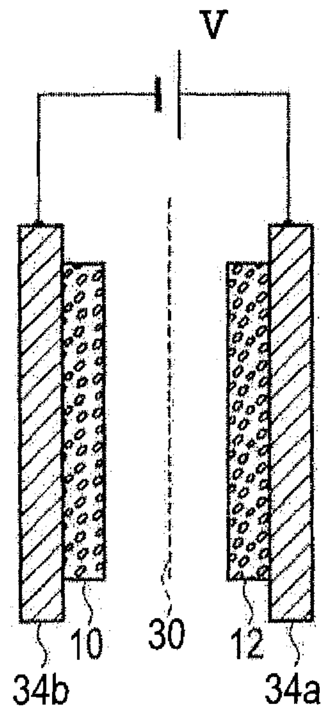
FIG. 43 is a schematic planar pattern configuration diagram illustrating a fundamental structure of an EDLC internal electrode, in the laminated type energy device applicable to the LED flash module according to the first to fifth embodiments.

FIG. 43 illustrates a schematic planar pattern configuration of a fundamental structure of an EDLC internal electrode, in the laminated type energy device 18 applicable to the LED flash module according to the first to fifth embodiments. The EDLC internal electrode is composed so that the separator in which only the electrolysis solution and ion pass therethrough is inserted between the active material electrodes 11 and 12 having at least one layer, and the extraction electrodes 34*a* and 34*b*1 are exposed from the active material electrodes 10 and 12, and, and the extraction electrodes 34*a* and 34*b* are connected to the power supply voltage. The extraction electrodes 34*a* and 34*b* are formed of aluminum foil, for example, and the active material electrodes 10 and 12 are formed of activated carbon, for example. The separator 30 whose size is larger (whose area is wider) than those of the active material electrodes 10 and 12 is used so that whole of the active material electrode 10 and the 12 is covered. Although the separator 30 is not theoretically dependent on a kind of energy device, high thermal resistance is required when in particular corresponding to a reflow is needed. As the separator 30, polypropylene etc. can be used when high thermal resistance is not required, or cellulosic based materials can be used when high thermal resistance is required. The electrolysis solution 44 is impregnated in the EDLC internal electrode, and the electrolysis solution and ions are moved through the separator 30 at the time of charge and discharge.

(Lithium Ion Capacitor Internal Electrode)

Figure 44:
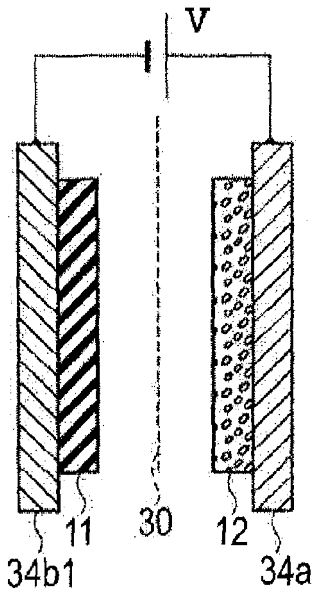
FIG. 44 is a schematic planar pattern configuration diagram illustrating a fundamental structure of a lithium ion capacitor internal electrode, in the laminated type energy device applicable to the LED flash module according to the first to fifth embodiments.

FIG. 44 illustrates a schematic planar pattern configuration of a fundamental structure of a lithium ion capacitor internal electrode, in the laminated type energy device 18 applicable to the LED flash module according to the first to fifth embodiments. The lithium ion capacitor internal electrode is composed so that the separator 30 in which only the electrolysis solution and ion pass therethrough is inserted between the active material electrodes 11 and 12 having at least one layer, and the extraction electrodes 34*a* and 34*b*1 are exposed from the active material electrodes 10 and 12. The extraction electrodes 34*a* and 34*b* are connected to the power supply voltage. The active material electrode 12 of the positive electrode side is formed of activated carbon, for example, and the active material electrode 11 of the negative electrode side is formed of Li doped carbon, for example. The extraction electrode 34*a* of the positive electrode side is formed of aluminum foil, for example, and the extraction electrode 24*b*1 of the negative electrode side is formed of copper foil, for example. The separator 30 whose size is larger (whose area is wider) than those of the active material electrodes 11 and 12 is used so that whole of the active material electrode 11 and the 12 is covered. The electrolysis solution 44 is impregnated in the lithium ion capacitor internal electrode, and the electrolysis solution and ions and are moved through the separator 30 at the time of charge and discharge.

(Lithium Ion Battery Internal Electrode)

Figure 45:
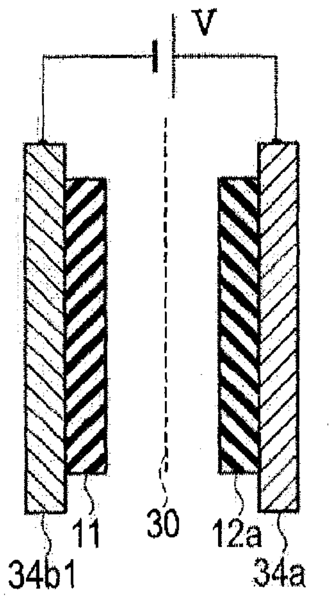
FIG. 45 is a schematic planar pattern configuration diagram illustrating a fundamental structure of a lithium ion battery internal electrode, in the laminated type energy device applicable to the LED flash module according to the first to fifth embodiments.
Figure 46:
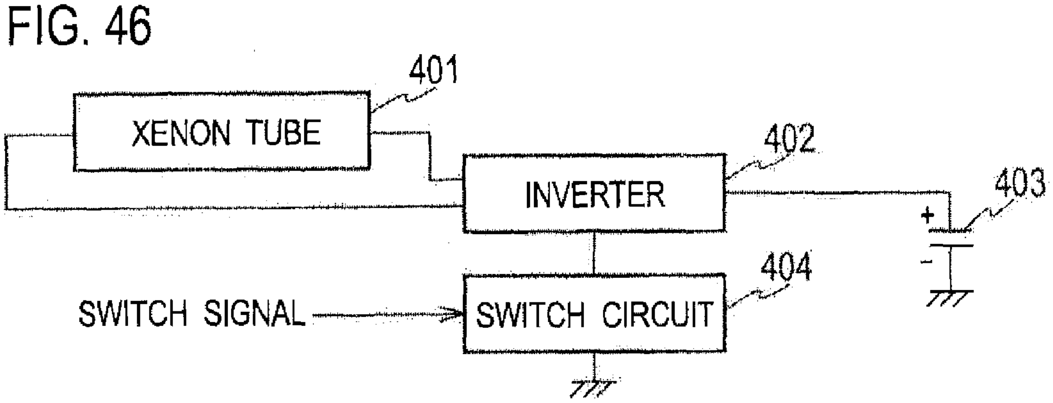
FIG. 46 is a schematic block configuration diagram of a conventional flash device.

FIG. 45 illustrates a schematic planar pattern configuration of a fundamental structure of a lithium ion battery internal electrode, in the laminated type energy device 18 applicable to the LED flash module according to the first to fifth embodiments. The lithium ion battery internal electrode is composed so that the separator 30 in which only the electrolysis solution and ion pass therethrough is inserted between the active material electrodes 11 and 12*a* having at least one layer, and the extraction electrodes 34*a* and 34*b*1 are exposed from the active material electrodes 10 and 12*a*. The extraction electrodes 34*a* and 34*b* are connected to the power supply voltage. The active material electrode 12*a* of the positive electrode side is formed of $LiCoO_2$, for example, and the active material electrode 11 of the negative electrode side is formed of Li doped carbon, for example. The extraction electrode 34*a* of the positive electrode side is formed of aluminum foil, for example, and the extraction electrode 24*b*1 of the negative electrode side is formed of copper foil, for example. The separator 30 whose size is larger (whose area is wider) than those of the active material electrodes 11 and 12*a* is used so that whole of the active material electrode 11 and the 12*a* is covered. The electrolysis solution 44 is impregnated in the lithium ion battery internal electrode, and the electrolysis solution and ions are moved through the separator 30 at the time of charge and discharge.

As explained above, there can be provided the LED flash module, the LED module, and the imaging device, each which can reduce the time required for electric charging under low voltage operations, and also can reduce physical size and weight thereof.

Other Embodiments

As explained above, the first to fifth embodiments has been described, as a disclosure including associated description and drawings to be construed as illustrative, not restrictive. This disclosure makes clear a variety of alternative embodiments, working examples, and operational techniques for those skilled in the art.

Such being the case, the embodiments cover a variety of embodiments, whether described or not.

INDUSTRIAL APPLICABILITY

The LED flash module and the LED module according to the embodiments described herein are applicable to flash devices. Such flash devices can be applied to photographing instruments, e.g. digital cameras and monitoring cameras. In addition, it is also possible to apply also to products on which many LED elements, e.g. LED bulb, are mounted.

What is claimed is:

1. An LED flash module comprising:

a module substrate;

an energy device arranged on the module substrate, the energy device comprising at least two layers of layered structure in which a positive electrode and a negative electrode of an active material electrode are alternately laminated so that a positive electrode and a negative electrode of extraction electrodes portions are exposed, while inserting a separator through which an electrolysis solution and ions can pass between the active material electrode portions of electrodes in which the positive and negative active material electrodes and the positive and negative extraction electrodes are integrated;

an LED module arranged on the module substrate, the LED module in which a plurality of LED block units are arranged in a specific direction, the LED block units in which a plurality of LED elements emitting light using a power source supplied from the energy device are arranged in an orthogonal direction to the specific direction;

a charger circuit disposed on the module substrate, and charger circuit configured to charge the energy device; and a control circuit disposed on the module substrate, the control circuit configured to control light emission from the LED element, wherein the LED flash module is structured such that, when plural rows of LED elements are arranged thereon, electrodes, selected from the group consisting of anode electrodes and cathode electrodes, respectively formed on the LED elements of the adjacent rows are arranged so as to be opposed to each other, and any one of anode wiring or cathode wiring formed on the module substrate is common wiring;

a switch is provided for each LED element; and the control circuit is structured to selectively light a desired LED element by individually controlling the switch of the desired LED element.

2. The LED flash module according to claim 1, wherein the LED elements are assigned in staggered arrangement for each row.

3. The LED flash module according to claim 1, wherein each row of the LED elements is arranged in the same row.

4. An imaging device comprising:

the LED flash module according to claim 1 mounted thereon.

5. An LED module comprising:

an LED block unit in which a plurality of LED elements arranged in a specific direction, wherein a plurality of the LED block units are arranged in an orthogonal direction with respect to the specific direction and the LED module is structured such that, when plural rows of LED elements are arranged thereon, electrodes, selected from the group consisting of anode electrodes and cathode electrodes, respectively formed on the LED elements of the adjacent rows are arranged so as to be opposed to each other, and any one of anode wiring or cathode wiring formed on the module substrate is common wiring;

a switch is provided for each LED element; and a control circuit configured to control the LED elements and selectively light a desired LED element by individually controlling the switch of the desired LED element.

6. The LED module according to claim 5, wherein the LED elements are assigned in staggered arrangement for each row.

7. The LED module according to claim 5, wherein each row of the LED elements is arranged in the same row.

* * * * *